(12) United States Patent
Kim et al.

(10) Patent No.: US 11,552,357 B2
(45) Date of Patent: Jan. 10, 2023

(54) SECONDARY BATTERY AND MANUFACTURING METHOD THEREFOR

(71) Applicant: Samsung SDI Co., Ltd., Yongin-si (KR)

(72) Inventors: Ki Jun Kim, Yongin-si (KR); Hei Chan An, Yongin-si (KR); Hyun Seok Jeong, Yongin-si (KR); Seong Jin Jo, Yongin-si (KR); Sang Hyun Kim, Yongin-si (KR); Seung Chan Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 263 days.

(21) Appl. No.: 16/956,523

(22) PCT Filed: Sep. 27, 2018

(86) PCT No.: PCT/KR2018/011432
§ 371 (c)(1),
(2) Date: Jun. 19, 2020

(87) PCT Pub. No.: WO2019/146872
PCT Pub. Date: Aug. 1, 2019

(65) Prior Publication Data
US 2022/0131217 A1    Apr. 28, 2022

(30) Foreign Application Priority Data
Jan. 24, 2018  (KR) .................. 10-2018-0009016

(51) Int. Cl.
*H01M 50/14*    (2021.01)
*H01M 50/105*   (2021.01)
(Continued)

(52) U.S. Cl.
CPC ............... *H01M 50/14* (2021.01); *B32B 3/14* (2013.01); *B32B 7/12* (2013.01); *B32B 15/085* (2013.01);
(Continued)

(58) Field of Classification Search
CPC .. H01M 50/14; H01M 50/105; H01M 50/129; B32B 3/14; B32B 7/12; B32B 15/085; B32B 2457/10
See application file for complete search history.

(56) References Cited

U.S. PATENT DOCUMENTS 8,852,785 B2    10/2014  Hosaka et al.
2005/0282069 A1 12/2005  Kim et al.
(Continued)

FOREIGN PATENT DOCUMENTS

JP    2015-133261 A    7/2015
KR    10-0561310 B1    3/2006
(Continued)

OTHER PUBLICATIONS

KR20060056630 translation (Year: 2006).*
(Continued)

*Primary Examiner* — Jane J Rhee
(74) *Attorney, Agent, or Firm* — Lewis Roca Rothgerber Christie LLP

(57) ABSTRACT

Various embodiments of the present invention relate to a secondary battery and a manufacturing method therefor, and the objective of the present invention is to provide a secondary battery having improved safety and a manufacturing method therefor, the secondary battery preventing an electrode assembly from moving inside a laminate exterior material during a drop shock and/or collision, thereby suppressing a voltage drop, a heating phenomenon, and/or ignition and the like caused by a small short between a (Continued)

cathode plate and an anode plate. To this end, disclosed in various embodiments of the present invention are a secondary battery and a manufacturing method therefor, the battery comprising: an electrode assembly including a first electrode plate, a second electrode plate, and a separator interposed between the first electrode plate and the second electrode plate; a pouch exterior case for encompassing the electrode assembly; and an adhesive dispensed in a dot array form on a surface of the pouch exterior case toward the electrode assembly.

17 Claims, 15 Drawing Sheets

(51) Int. Cl.
*H01M 50/129* (2021.01)
*B32B 3/14* (2006.01)
*B32B 7/12* (2006.01)
*B32B 15/085* (2006.01)

(52) U.S. Cl.
CPC ....... *H01M 50/105* (2021.01); *H01M 50/129* (2021.01); *B32B 2457/10* (2013.01)

(56) References Cited

U.S. PATENT DOCUMENTS

2011/0294007 A1 12/2011 Hosaka et al.
2019/0229361 A1* 7/2019 Kim .................... H01M 50/124

FOREIGN PATENT DOCUMENTS

| KR | 10-2011-0111524 A | 10/2011 |
| KR | 10-1165458 B1 | 7/2012 |
| KR | 10-2014-0132528 A | 11/2014 |
| KR | 10-2016-0075197 A | 6/2016 |
| KR | 10-2016-0110090 A | 9/2016 |
| KR | 10-1750087 B1 | 7/2017 |

OTHER PUBLICATIONS

Korean Office Action dated Mar. 24, 2021, issued in corresponding Korean Patent Application No. 10-2018-0009016 (8 pages).

* cited by examiner ated herein by reference.

SECONDARY BATTERY AND MANUFACTURING METHOD THEREFOR

CROSS-REFERENCE TO RELATED APPLICATION(S)

This application is a National Phase Patent Application of International Patent Application Number PCT/KR2018/011432, filed on Sep. 27, 2018, which claims priority of Korean Patent Application No. 10-2018-0009016, filed Jan. 24, 2018. The entire contents of both of which are incorporated herein by reference.

TECHNICAL FIELD

Various embodiments of the present invention relate to a secondary battery and a manufacturing method therefor.

BACKGROUND ART

Unlike a primary battery that is not rechargeable, a secondary battery can be charged and discharged. A low-capacity secondary battery is used for various small portable electronic devices such as smart phones, feature phones, notebook computers, digital cameras or camcorders, and a high-capacity secondary battery is extensively used as a power source for driving a motor of a hybrid car or an electric car, a power storage cell, and the like.

Such a secondary battery may include an electrode assembly having positive and negative electrodes, a laminate exterior material or case accommodating the electrode assembly, and an electrode terminal connected to the electrode assembly. In addition, the laminate exterior case may be classified as a cylindrical type, a prismatic type or a pouch type according to the external shape thereof. Among others, a pouch type secondary battery may include a laminate exterior material that can be easily transformed to have various shapes and has a small weight.

The above information disclosed in this Background section is only for enhancement of understanding of the background of the described technology and therefore it may contain information that does not form the prior art that is already known in this country to a person of ordinary skill in the art.

DESCRIPTION OF EMBODIMENTS

Technical Problem

Various embodiments of the present invention provide a secondary battery having improved safety, and a manufacturing method therefor, the secondary battery preventing an electrode assembly from moving inside a laminate exterior case during a drop shock and/or collision, thereby suppressing a voltage drop, a heating phenomenon, and/or ignition and the like caused by a small short between a cathode plate and an anode plate.

In addition, various embodiments of the present invention provide a secondary battery having improved lifetime characteristics by uniformly compressing the overall area of an electrode assembly during a manufacturing process of the electrode assembly, rather than by locally compressing the electrode assembly, and a manufacturing method therefor.

In addition, various embodiments of the present invention provide a secondary battery capable of improving adhesion strength between a laminate exterior case and an electrode assembly, and a manufacturing method therefor.

In addition, various embodiments of the present invention provide a secondary battery capable of improving adhesion of a laminate exterior case with respect to a sealing portion, and a manufacturing method therefor.

Solution to Problem

According to various embodiments of the present invention, provided is a secondary battery including: an electrode assembly including a first electrode plate, a second electrode plate, and a separator interposed between the first electrode plate and the second electrode plate; a pouch exterior material for encompassing the electrode assembly; and adhesives dispensed in a dot array form on a surface of the pouch exterior material toward the electrode assembly.

The pouch exterior material may include a first exterior case portion being in contact with one long side portion of the electrode assembly; and a second exterior case portion extending from the first exterior case portion and being in contact with the other long side portion of the electrode assembly, wherein the adhesives are formed on the first exterior case portion, on the second exterior case portion, or on both of the first and second exterior case portions.

The first and second exterior case portions may include sealing portions adhered to each other from the outside of the electrode assembly, and each of the sealing portions further includes the adhesive.

The pouch exterior material may include a first insulation layer encompassing the electrode assembly; a metal layer formed on the first insulation layer; and a second insulation layer formed on the metal layer, wherein the adhesives are formed on the first insulation layer.

The first insulation layer may include casted polypropylene or modified polypropylene.

The adhesives may include anchoring parts coupled to the first insulation layer.

The adhesives dispensed in the dot array form may include a regular quadrilateral form, or a zigzag form in which neighboring columns cross each other.

Before compressing the pouch exterior case and the electrode assembly, the adhesives dispensed in the dot array form may be shaped of triangles, quadrangles, pentagons, hexagons, polygons, circles or stars, which are spaced apart from each other with empty spaces therebetween, and after compressing the pouch exterior case and the electrode assembly, the compressed adhesives may overlap each other without empty spaces therebetween.

The adhesives dispensed in the dot array form may overlap each other to form a line, and the line includes multiple lines.

The adhesives may be adhered to the first electrode plate, the second electrode plate, or the separator in the electrode assembly.

The adhesives may have a thickness in a range of 1 µm to 50 µm.

The adhesives may have a peel strength in a range of 300 gf/25 mm to 2500 gf/25 mm.

The adhesives may have a pitch in a range of 1 mm to 5 mm and a diameter in a range of 0.8 mm to 5 mm.

After compression, the compressed adhesives may have a pitch in a range of 1 mm to 5 mm and an equivalent diameter in a range of 1.1 mm to 7 mm.

The adhesives may be shaped to form deformed circles or deformed by overlapping portions thereof in contact with each other.

The adhesives may include any one of polymers selected from the group consisting of cellulose, polyvinylidenefluoride-cohexafluoropropylene, polyvinylidene fluoride-cotrichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose, and polypropylene-maleic acid anhydride, or a mixture of two or more thereof.

According to various embodiments of the present invention, provided is a method for manufacturing a secondary battery, the method including: preparing a planar pouch exterior case; forming at least one recess in some regions of the pouch exterior case so as to allow the pouch exterior case to accommodate electrode assembly; dispensing adhesives on at least one of the planar surface of the pouch exterior case and the bottom surface of the recess in a dot array form; and accommodating the electrode assembly in the recess of the pouch exterior case, sealing, and then compressing the pouch exterior case and the electrode assembly for the adhesives to adhere the pouch exterior case and the electrode assembly to each other.

According to various embodiments of the present invention, provided is a method for manufacturing a secondary battery, the method including: preparing a planar pouch exterior case; dispensing adhesives on at least some regions of the pouch exterior case in a dot array form; forming at least one recess in some regions of the pouch exterior case so as to allow the pouch exterior case to accommodate electrode assembly; and accommodating the electrode assembly in the recess of the pouch exterior case, sealing, and then compressing the pouch exterior case and the electrode assembly for the adhesives to adhere the pouch exterior case and the electrode assembly to each other.

Advantageous Effects of Invention

As described above, in the secondary battery according to various embodiments of the present invention, and the manufacturing method therefor, the secondary battery may prevent an electrode assembly from moving inside a laminate exterior case during a drop shock and/or collision, thereby suppressing a voltage drop, a heating phenomenon, and/or ignition and the like caused by a small short between a cathode plate and an anode plate.

That is to say, in the secondary battery according to various embodiments of the present invention, and the manufacturing method therefor, before compressing the laminate exterior case and the electrode assembly, adhesives are applied to the overall entire surface of the laminate exterior case or the surface of the laminate exterior case being in contact with the electrode assembly in a dot array form or in a matrix form, and thus an electrolyte is allowed to freely move along the adhesives in the dot array form or in the matrix form while the electrolyte is injected. Then, after compressing the laminate exterior case and the electrode assembly, the laminate exterior case and the electrode assembly may be firmly adhered to each other by the adhesive. Accordingly, the electrode assembly may not move inside the laminate exterior case during a drop shock and/or collision.

In addition, in the secondary battery according to various embodiments of the present invention, and the manufacturing method therefor, after compressing a laminate exterior case and an electrode assembly, the adhesives in the dot array form or in the matrix form may extend wide to form a wide adhesion area, thereby further improving adhesion strength between the laminate exterior case and the electrode assembly. In addition, in the secondary battery according to various embodiments of the present invention, and the manufacturing method therefor, the overall areas of the laminate exterior case and the electrode assembly are uniformly compressed, rather than being locally compressed, during the manufacture, thereby improving lifetime characteristics.

That is to say, in the secondary battery according to various embodiments of the present invention, and the manufacturing method therefor, the adhesives are formed more widely on entire one surface or on entire both surfaces of a laminate exterior case to a uniform thickness in a dot array form or in a matrix form, and thus, when the laminate exterior case and the electrode assembly are thermally compressed using a thermal compression jig, a force derived from the thermal compression jig is uniformly applied to the entire areas of the laminate exterior case and the electrode assembly, thereby allowing the electrode assembly to undergo little change in characteristics, and ultimately improving life characteristics of the secondary battery.

In addition, in the secondary battery according to various embodiments of the present invention, and the manufacturing method therefor, adhesion strength between the laminate exterior case and the electrode assembly may be improved.

That is to say, in the secondary battery according to various embodiments of the present invention, and the manufacturing method therefor, when the outermost part of the electrode assembly is a metal layer, polar adhesives are applied to a laminate exterior case (insulation layer) to allow the metal layer to be adhered to the laminate exterior case (insulation layer), and when the outermost part of the electrode assembly is a separator, non-polar adhesives are applied to the laminate exterior case (insulation layer) to allow the separator to be adhered to the laminate exterior case (insulation layer), thereby further improving adhesion strength between the laminate exterior case and the electrode assembly.

In addition, in the secondary battery according to various embodiments of the present invention, and the manufacturing method therefor, adhesion of a laminate exterior case with respect to a sealing portion may be improved.

That is to say, in the secondary battery according to various embodiments of the present invention, and the manufacturing method therefor, not only a sealing material of the sealing portion but also the adhesives are both sealed and adhered, thereby further improving the sealing capacity of a pouch exterior case by the sealing portion.

MODE OF INVENTION

Figure 1A:
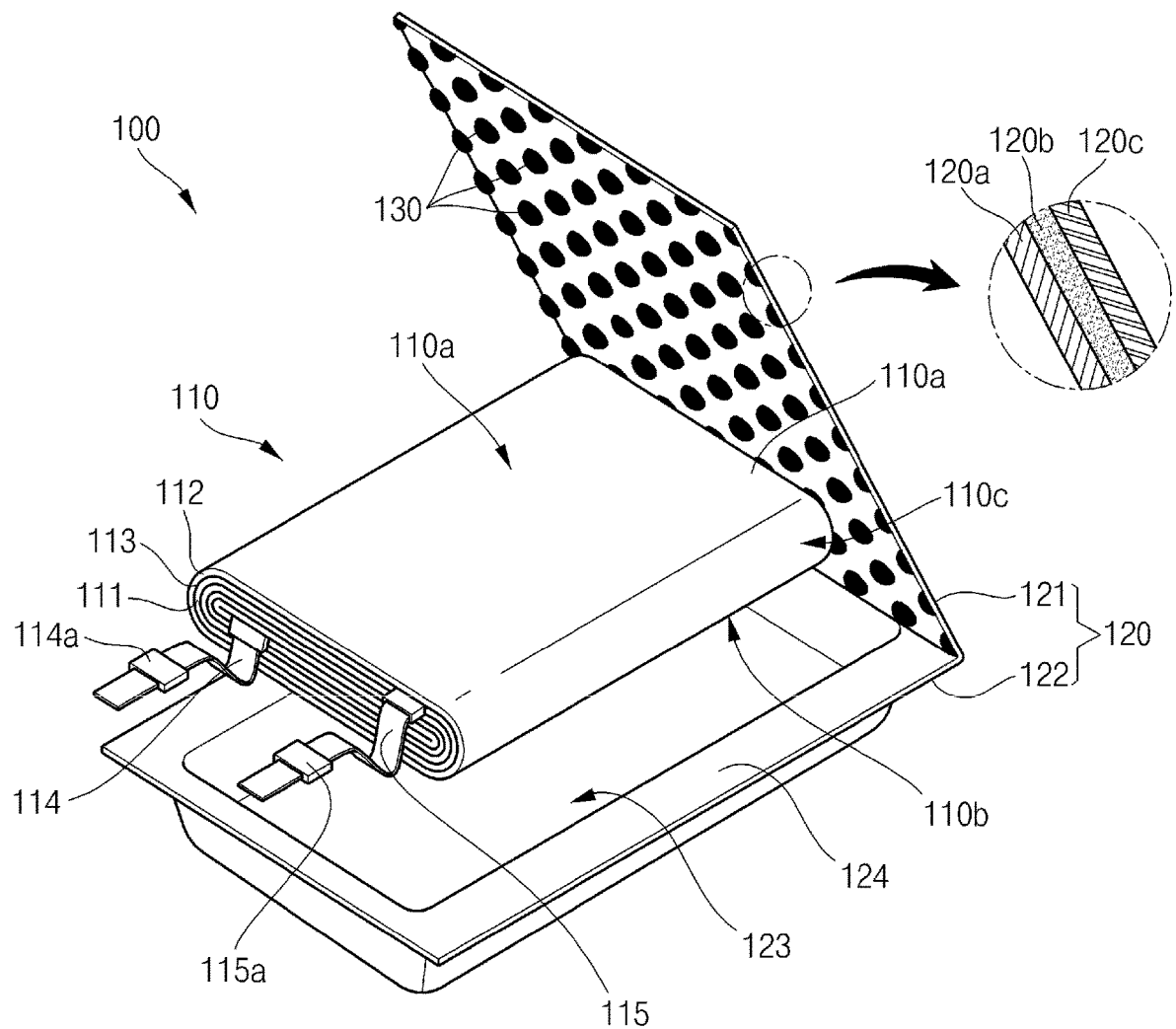
FIGS. 1A to 1C are an exploded perspective view, a plan view and a partially perspective view of a secondary battery according to various embodiments.

Hereinafter, example embodiments of the present invention will be described in detail.

Various embodiments of the present invention may be embodied in many different forms and should not be construed as being limited to the example embodiments set forth herein. Rather, these example embodiments of the invention are provided so that this invention will be thorough and complete and will convey inventive concepts of the invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the element or feature in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 1B:
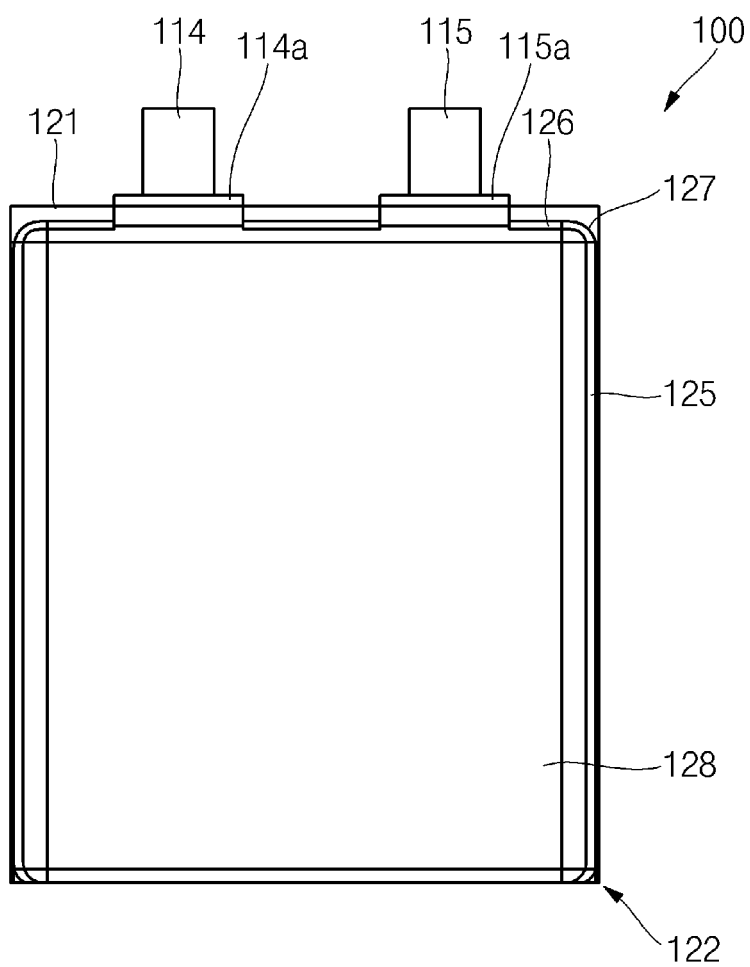
Figure 1C:
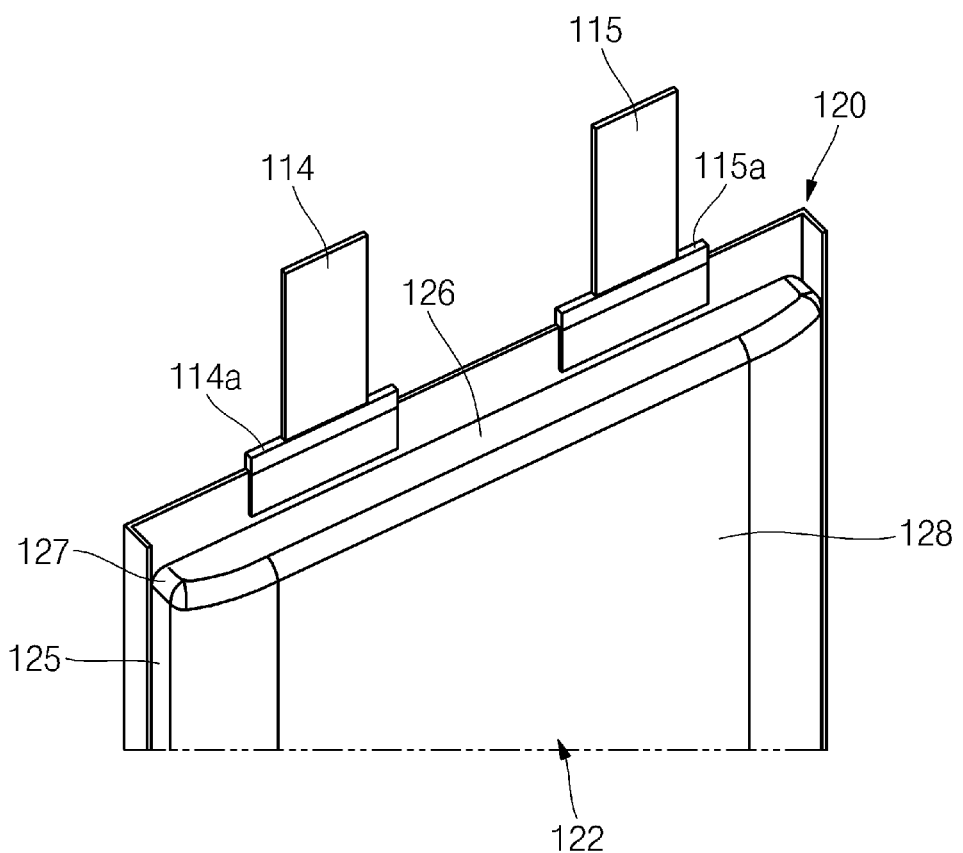

Referring to FIGS. 1A to 1C, an exploded perspective view, a plan view and a partially perspective view of a secondary battery 100 according to various embodiments are illustrated.

As illustrated in FIGS. 1A to 1C, the secondary battery 100 according to various embodiments may include an electrode assembly 110, a laminate exterior case 120, and adhesives 130 dispensed on the laminate exterior case 120 in a dot array form and/or a matrix form to adhere the electrode assembly 110 and the laminate exterior case 120 to each other.

The laminate exterior case 120 used herein may be referred to as a pouch, a pouch exterior material or case, or a pouch case.

The electrode assembly 110 may include an anode plate 111, a cathode plate 112, and a separator 113 located between the anode plate 111 and the cathode plate 112. The electrode assembly 110 may be formed by winding a stacked structure of the anode plate 111, the separator 113 and the cathode plate 112 in a jelly roll type. In an alternative embodiment, a stack type electrode assembly formed by sequentially stacking the anode plate 111, the separator 113 and the cathode plate 112 in that order multiple times may also be used. Accordingly, the winding type or the stack type electrode assembly 110 may have one of the anode plate 111, the cathode plate 112 and the separator 113 positioned at its outermost part.

The anode plate 111 includes an anode active material layer coated on both surfaces of an anode current collector made of a conductive metal thin plate, e.g., a copper or nickel foil or mesh, but not limited thereto. For example, a carbon-based material, Si, Sn, tin oxide, tin alloy composite, transition metal oxide, lithium metal nitride or lithium metal oxide may be used as the anode active material layer, but not limited thereto. For example, a substantially planar anode tab 114 may be formed (e.g., welded) on an anode uncoated portion of the anode current collector, where the anode active material layer is not formed, but aspects are not limited thereto. That is to say, one end of the anode tab 114 may be electrically connected to the anode uncoated portion and the other end of the anode tab 114 may protrude to the outside. In addition, an insulation member 114a may be attached to the anode tab 114 to prevent the anode tab 114 from being shorted to the laminate exterior case 120.

The cathode plate 112 includes a cathode active material layer coated on both surfaces of a cathode current collector made of a highly conductive metal thin plate, e.g., an aluminum foil or mesh, but not limited thereto. Here, a chalcogenide compound may be used as the cathode active material layer, but not limited thereto. For example, a composite metal oxide, e.g., LiCoO2, LiMn2O4, LiNiO2, or LiNiMnO2, may be used. For example, a cathode tab 115 may be formed (e.g., welded) on a cathode electrode uncoated portion of the cathode current collector, where the cathode active material layer is not formed, but aspects are not limited thereto. In addition, an insulation member 115a may be attached to the cathode tab 115 to prevent the cathode tab 115 from being shorted to the laminate exterior case 120.

The separator 113 is located between the anode 111 and the cathode 112 and prevents an electric short between the anode 111 and the cathode 112. The separator 113 may include, but not limited to, a pair of separators, and may be configured such that the anode plate 111 is held between the pair of separators 113. In addition, the separator 113 may be made of any one selected from the group consisting of polyethylene, polypropylene, and a porous copolymer of polyethylene and polypropylene. In order to prevent an electric short from occurring between the anode 111 and the cathode 112, the separator 113 may be formed to have a larger width than the anode 111 and the cathode 112.

Meanwhile, the electrode assembly 110 may include a first long side region 110a that is relatively wide and planar, a second long side region 110b that is opposite to the first long side region 110a and is relatively wide and planar, and four short side regions 110c that connect the first and second long side regions 110a and 110b and are relatively narrow. Among the four short side regions 110c, a pair of facing short side regions are substantially round, and another pair of facing short side regions are substantially planar.

The laminate exterior material or case 120 accommodates the electrode assembly 110 and is formed by sealing the outer periphery of the electrode assembly 110. The laminate exterior case 120 may include, for example, a first exterior case portion 121 and a second exterior case portion 122 having one end connected to the first exterior case portion 121, and a recess 123 having a predetermined depth so as to accommodate the electrode assembly 110.

In addition, edges 124 of the first and second exterior case portions 121 and 122, corresponding to the outer periphery of the electrode assembly 110, are thermally fused to each other, thereby allowing the electrode assembly 110 to be accommodated within the laminate exterior case 120 of a pouch type or a pocket type.

That is to say, the laminate exterior case 120 is configured to include the first and second exterior case portions 121 and 122 formed by bending the center of one side of the laminate exterior case 120 shaped of a rectangular plate in a lengthwise direction. The second exterior case portion 122 has the recess 123 having a predetermined depth formed by pressing or drawing so as to accommodate the electrode assembly 110, and a sealing portion 124, i.e., the edge of the second exterior case portion 122, is formed on the outer periphery of the recess 123 to be sealed with the first exterior case portion 121. The sealing portion 124 may be formed along one side where the first exterior case portion 121 and the second exterior case portion 122 integrally adjoin each other, and the other three sides of each of the first exterior case portion 121 and the second exterior case portion 122.

In addition, the second exterior case portion 122 includes four extending regions extending away from the first exterior case portion 121 and a bottom surface (planar region) connected to the four extending regions and corresponding to a bottom of the recess 123.

Here, the first long side region 110a of the electrode assembly 110 may be brought into contact with the first exterior case portion 121, and the second long side region 110b and the short side regions 110c of the electrode assembly 110 may be brought into contact with the second exterior case portion 122. Especially, the first long side region 110a of the electrode assembly 110 may be adhered to the substantially planar region of the first exterior case portion 121 of the laminate exterior case 120. Alternatively, the second long side region 110b of the electrode assembly 110 may be adhered to the bottom surface (planar region) of the recess 123 of the second exterior case portion 122 of the laminate exterior case 120.

Here, the adhesives 130 may be dispensed on at least one of the planar region of the first exterior case portion 121 of the laminate exterior case 120, corresponding to the first long side region 110a of the electrode assembly 110, and the bottom surface (planar region) of the recess 123 of the second exterior case portion 122 of the laminate exterior case 120, corresponding to the second long side region 110b of the electrode assembly 110, in a dot array form or in a matrix form. FIG. 1A illustrates an example in which the adhesives 130 are dispensed on the planar region of the first exterior case portion 121 of the laminate exterior case 120, corresponding to the first long side region 110a of the electrode assembly 110, in a dot array form or in a matrix form.

The anode tab 114 and the cathode tab 115 of the electrode assembly 110 are drawn to the outside through fused regions of the first exterior case portion 121 and the second exterior case portion 122. Here, the insulation members 114a and 115b formed on the anode tab 114 and the cathode tab 115 are sealed with the sealing portion 124. That is to say, the insulation members 114a and 115b are formed at contact portions between the anode tab 114 and the cathode tab 115 and the sealing portion 124 to prevent electrical shorts between the anode tab 114 and the cathode tab 115 and the laminate exterior case 120.

The laminate exterior case 120 may be formed to have a multi-layered structure including a first insulation layer 120a, a metal layer 120b, and a second insulation layer 120c, but not limited thereto. In addition, the laminate exterior case 120 may also include various adhesive layers or functional layers, but detailed descriptions thereof will not be given so as not to obscure the subject matter.

The first insulation layer 120a defines an internal surface of the laminate exterior case 120 and is made of an insulating and thermally adhesive material. In addition, the first insulation layer 120a is formed on a first surface of the metal layer 120b and defines an internal surface of the laminate exterior case 120 facing the electrode assembly 110. The first insulation layer 120a may be made of, e.g., casted polypropylene (CPP) or an equivalent thereof, which is not reactive with an electrolyte, but not limited thereto. If the electrode assembly 110 is accommodated in the recess 123 of the second exterior case portion 122 and is covered with the first exterior case portion 121, the first insulation layers 120a of the first and second exterior case portions 121 and 122 of the laminate exterior case 120 are brought into contact with each other. Therefore, if the sealing portion 124 is thermally fused, the first insulation layers 120a of the first and second exterior case portions 121 and 122 are adhered to each other, thereby sealing the laminate exterior case 120. Here, the adhesives 130 may also be dispensed on the sealing portion 124 in a dot array form or in a matrix form, and thus the sealing portion 124 may include the adhesives 130.

The metal layer 120b is located between the first insulation layer 120a and the second insulation layer 120c and prevents external moisture and oxygen from penetrating into the laminate exterior case 120. If an electrolyte fills the laminate exterior case 120, the metal layer 120b prevents the electrolyte filling the laminate exterior case 120 from leaking to the outside. In addition, the metal layer 120b maintains mechanical strength of the laminate exterior case 120. In general, the metal layer 120b may be made of, but not limited to, aluminum, an aluminum alloy, iron or an iron alloy.

The second insulation layer 120c defines an external surface of the laminate exterior case 120 and serves to absorb mechanical and chemical shocks, e.g., from an external electric device. In addition, the second insulation layer 120c is formed on a second surface of the metal layer 120b, i.e., on a surface opposite the first surface, to define the external surface of the laminate exterior case 120. The second insulation layer 120c may be made of, but not limited to, nylon, polyethylene terephthalate (PET), polybuthylene terephthalate (PBT), polybuthylene naphthalate (PBN), or an equivalent thereof.

In the secondary battery 100 according to various embodiments, the second exterior case portion 122 of the laminate exterior case 120 may include a plurality of extending regions 125, 126 and 127 extending away from the first exterior case portion 121, and a substantially planar region 128 connected to the plurality of extending regions 125, 126 and 127 and substantially parallel with the first exterior case portion 121. Here, the plurality of extending regions 125, 126 and 127 and the planar region 128 may define the recess 123 substantially accommodating the electrode assembly 110.

The adhesives 130 may be dispensed in a dot array form on, for example, at least one surface among the surface of the first insulation layer 120a of the at least one of the planar region of the first exterior case portion 121 of the laminate exterior case 120, facing the first long side region 110a of the electrode assembly 110, the entire surface of the first insulation layer 120a of the laminate exterior case 120, the surface of the first insulation layer 120a of the second exterior case portion 122 of the laminate exterior case 120, facing the second long side region 110b of the electrode assembly 110, and the entire surface of the first insulation layer 120a of the second exterior case portion 122 of the laminate exterior case 120. That is to say, the adhesives 130 are formed partially or entirely on the surface of the first insulation layer 120a of the laminate exterior case 120, for example, in a substantially matrix form having rows and columns (e.g., a regular quadrilateral form or a zigzag form), and then adhered to the first long side region 110a of the electrode assembly 110 or/and the second long side region 110b of the electrode assembly 110.

Here, the adhesives 130 dispensed in the dot array form may have a thickness of, but not limited to, approximately 1 μm to approximately 50 μm. When the thickness of the adhesives 130 is less than 1 μm, adhesion strength between the electrode assembly 110 and the laminate exterior case 120 and/or adhesion of the sealing portion 124, may be lowered. When the thickness of the adhesives 130 is greater than approximately 50 μm, the secondary battery 100 and the sealing portion 124 may become unnecessarily thick.

Such features regarding the thickness of the adhesives 130 can be commonly applied to all embodiments of the present invention.

The adhesives 130 dispensed in a dot array form may include any one of polymers selected from the group consisting of cellulose, polyvinylidenefluoride-cohexafluoropropylene, polyvinylidene fluoridecotrichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose, and polypropylene-maleic acid anhydride, or a mixture of two or more thereof. Herein, in an example, polybutylacrylate and polyacrylonitrile may be polar adhesives, and polypropylene-maleic acid anhydride may be a non-polar adhesive. Such features regarding the material of the adhesives 130 can be commonly applied to all embodiments of the present invention.

Figure 2A:
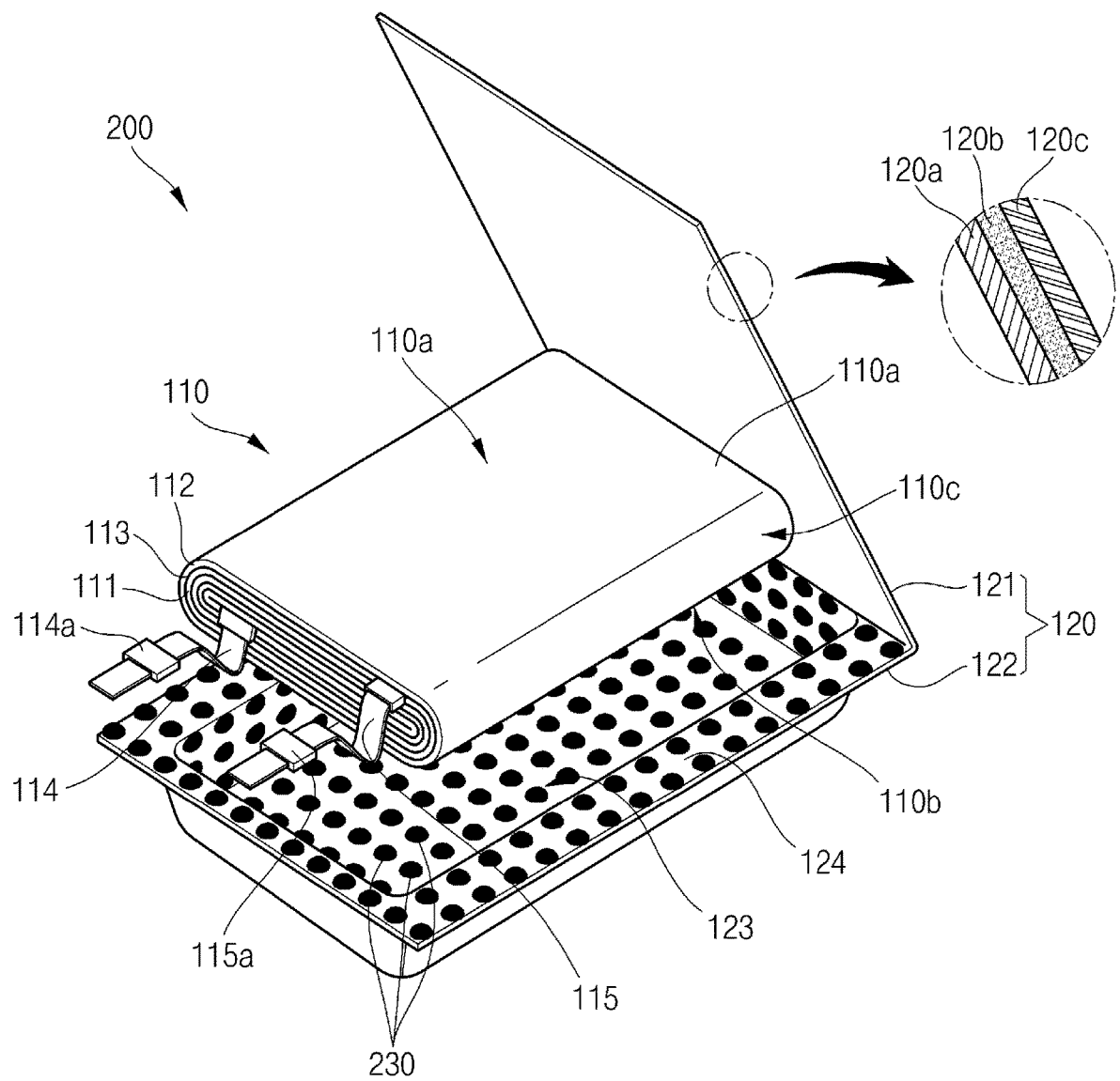
FIGS. 2A and 2B are exploded perspective views of a secondary battery according to various embodiments.
Figure 2B:
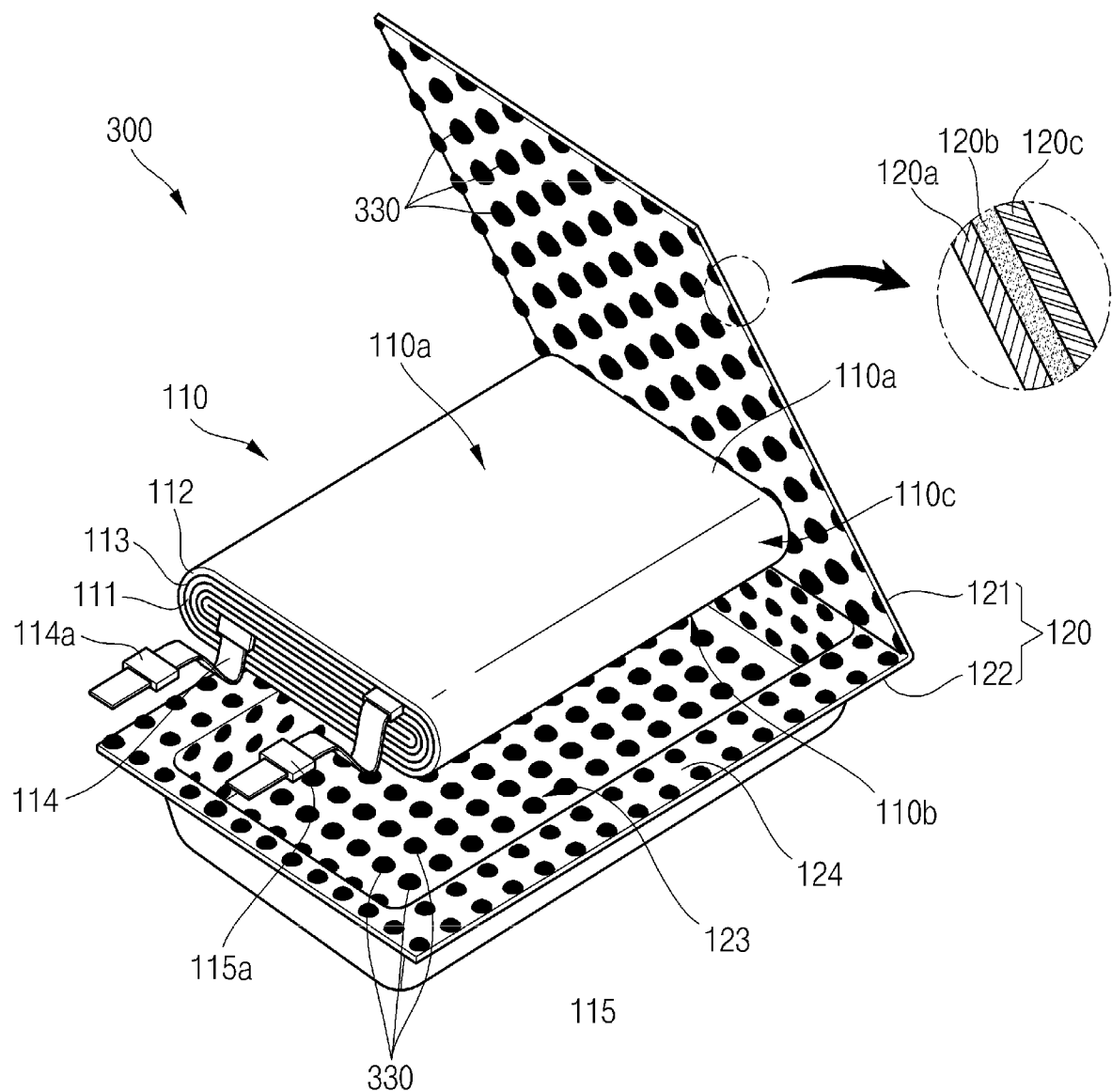

FIGS. 2A and 2B are exploded perspective views of a secondary battery according to various embodiments.

As illustrated in FIG. 2A, in the secondary battery 200 according to an embodiment, adhesives 230 may be dispensed on the entire surface of the second exterior case portion 122 of the laminate exterior case 120 or a bottom surface (planar region) of the laminate exterior case 120, corresponding to a second long side region 110b of the recess 123, in a dot array form or in a matrix form. In addition, the adhesives 230 may be dispensed on a sealing portion 124 as well as in the recess 123 of the second exterior case portion 122.

In addition, as illustrated in FIG. 2B, in the secondary battery 300 according to an embodiment, adhesives 330 may be dispensed on the entire surface of the first exterior case portion 121 of the laminate exterior case 120 and the entire surface of the second exterior case portion 122 of the laminate exterior case 120 in a dot array form or in a matrix form. Of course, the adhesives 330 may be dispensed on the sealing portion 124 formed by the first and second exterior case portions 121 and 122 adhered to each other.

In such a manner, the adhesives 330 may be adhered to a first long side region 110a, a second long side region 110b and/or short side regions 110c of the electrode assembly 110, thereby more efficiently preventing the electrode assembly 110 from moving inside the laminate exterior case 120. That is to say, in the secondary battery 300 according to various embodiments, not only the first and second long side regions 110a and 110b but also the short side regions 110c in the electrode assembly 110 are adhered to the laminate exterior case 120 through the adhesives 330, and thus the electrode assembly 110 may not move inside the laminate exterior case 120 during a battery impact test.

Figure 3A:
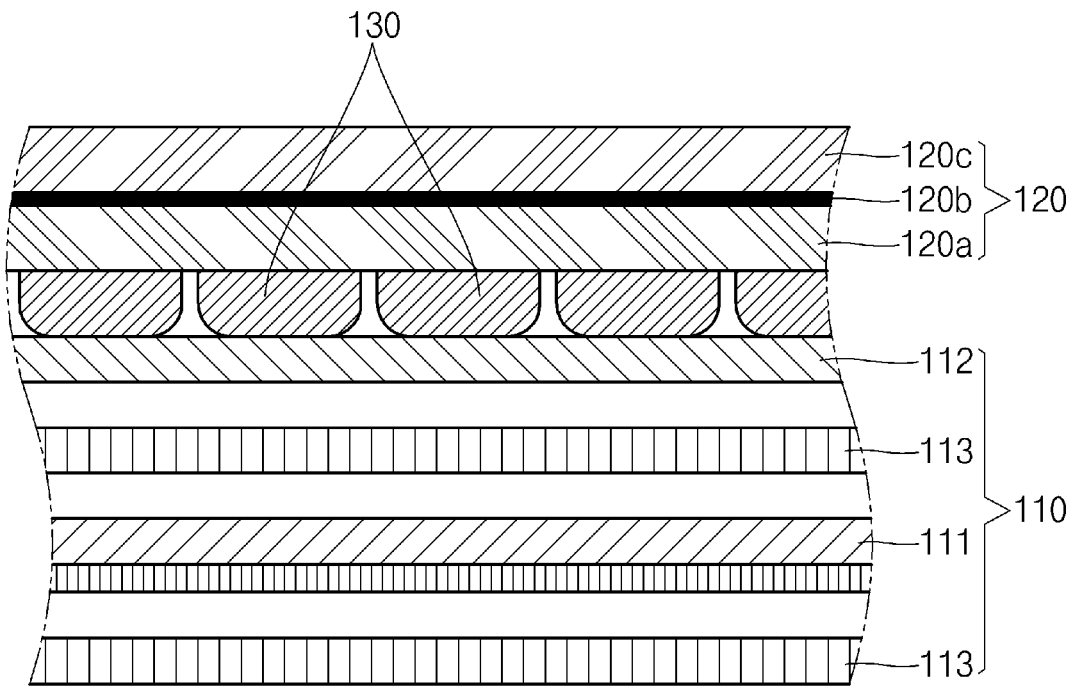
FIGS. 3A and 3B are partially cross-sectional views illustrating an adhesion state between a laminate exterior case and an electrode assembly in a secondary battery according to various embodiments, and FIG. 3C are a partially cross-sectional view illustrating an adhesion state of a sealing portion.
Figure 3B:
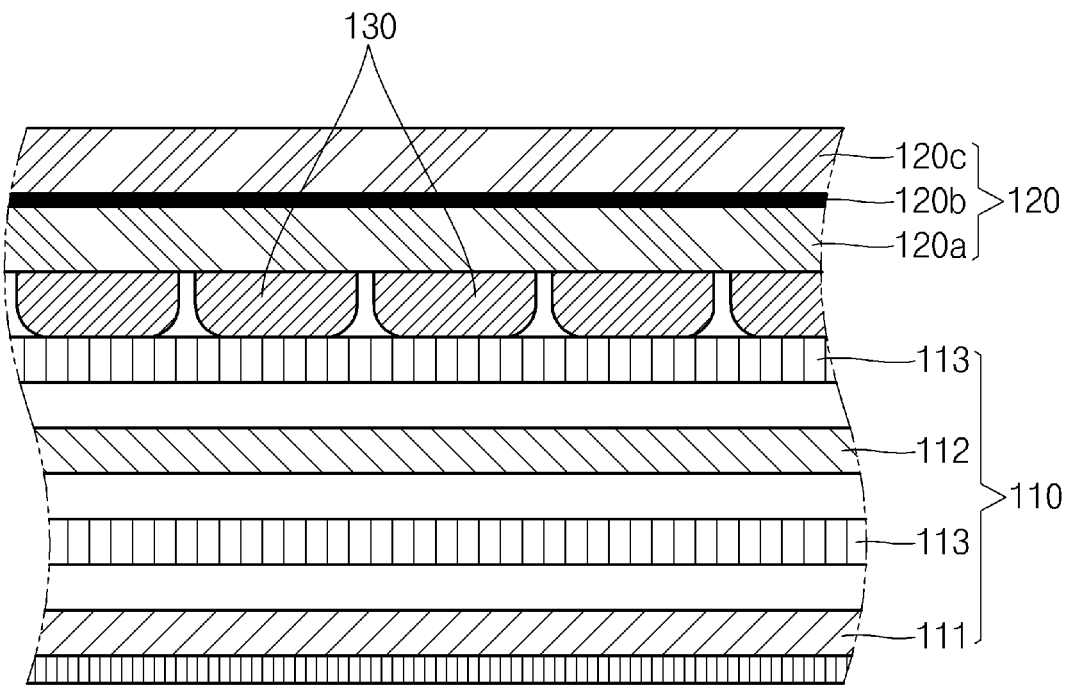
Figure 3C:
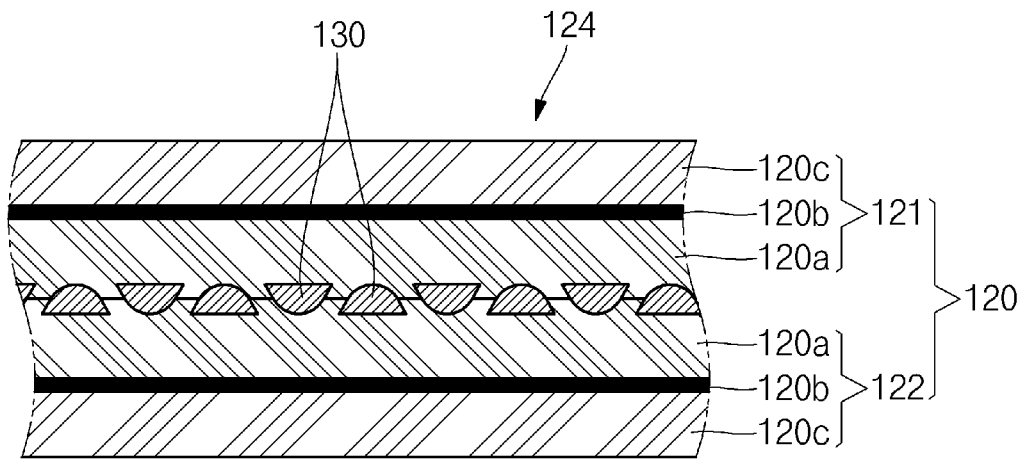

FIGS. 3A and 3B are partially cross-sectional views illustrating an adhesion state between a laminate exterior case and an electrode assembly in a secondary battery according to various embodiments, and FIG. 3C are a partially cross-sectional view illustrating an adhesion state of a sealing portion.

For a better understanding, the electrode assembly 110 that is loosely wound is shown in the illustrated embodiment. That is to say, in a practical secondary battery, there would be no empty space in the internal region of the electrode assembly 110.

As illustrated in FIG. 3A, the adhesives 130 are formed on the first insulation layer 120a of the laminate exterior case 120 to be adhered to the cathode plate 112 (e.g., a cathode uncoated portion or a cathode metal layer) of the electrode assembly 110. That is to say, if the electrode assembly 110 is finished with the cathode plate 112, the adhesives 130 may adhere the first insulation layer 120a of the laminate exterior case 120 and the cathode plate 112 of the electrode assembly 110 to each other. Here, the adhesives 130 are preferably polar adhesives that adhere a metal layer of the electrode assembly 110, which has a polarity, and an insulation layer of the laminate exterior case 120 to each other. That is to say, the polar adhesives are well adhered to a polar object to be adhered.

Of course, if the electrode assembly 110 is finished with the anode plate 111 (e.g., an anode uncoated portion or an anode metal layer), the adhesives 130 may adhere the first insulation layer 120a of the laminate exterior case 120 and the anode plate 111 of the electrode assembly 110 to each other.

Next, as illustrated in FIG. 3B, the adhesives 130 are formed on the first insulation layer 120a of the laminate exterior case 120 to then be adhered to the separator 113 of the electrode assembly 110. That is to say, if the electrode assembly 110 is finished with the separator 113, the adhesives 130 may adhere the first insulation layer 120a of the laminate exterior case 120 and the separator 113 of the electrode assembly 110 to each other. Here, since the adhesives 130 adhere the non-polar separator of the electrode assembly 110 and the insulation layer of the laminate exterior case 120 to each other, non-polar adhesives are preferred. That is to say, the non-polar adhesives are well adhered to the non-polar object to be adhered.

In addition, as illustrated in FIG. 3C, the adhesives 130 may also be formed on the sealing portion 124. In some examples, the adhesives 130 are formed on the first insulation layer 120a of the first exterior case portion 121, and thus the sealing portion 124 may be implemented. In other examples, the adhesives 130 may be formed on the first insulation layer 120a of the second exterior case portion 121, and thus the sealing portion 124 may be implemented. In some other examples, the adhesives 130 may be formed on each of the first insulation layer 120a of the first exterior case portion 121 and the first insulation layer 120a of the second exterior case portion 121, and thus the sealing portion 124 may be implemented.

Here, the adhesives 130 formed on the first exterior case portion 121 and the adhesives 130 formed on the second exterior case portion 122 may or may not face each other. In FIG. 3C, the adhesives 130 not facing each other are shown. In addition, the first insulation layer 120a formed on the first exterior case portion 121 and the first insulation layer 120a formed on the second exterior case portion 122 may thermally fused while covering each other's adhesives 130.

In this way, not only the first insulating layer 120a is thermally fused to each other in the region forming the sealing portion 124 among the first and second exterior case portions 121 and 122, but the adhesives 130 are adhered to each other. Therefore, the adhesion strength or the sealing capacity of the sealing portion 124 may be further improved.

Figure 4:
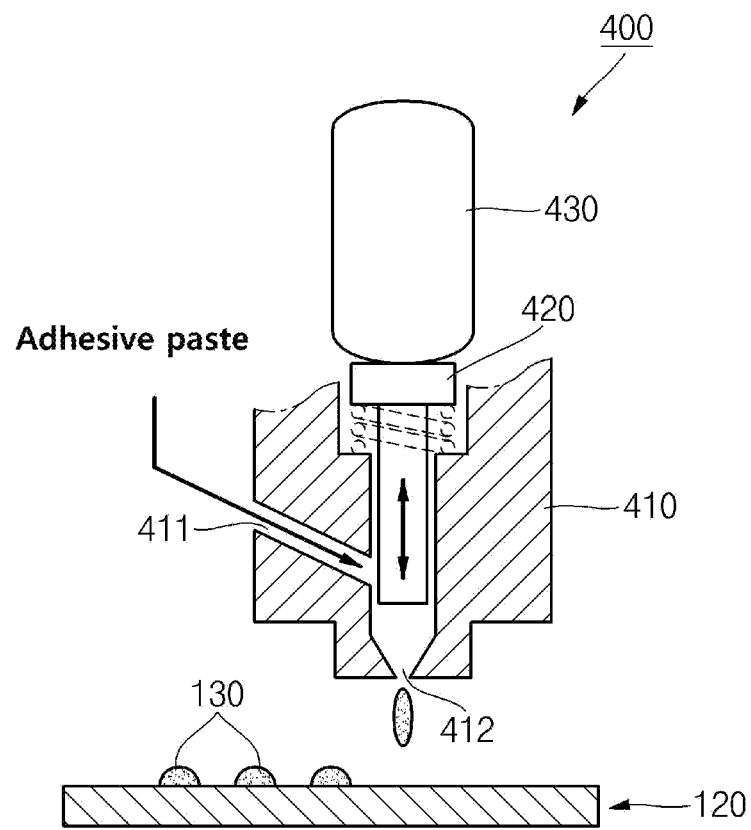
FIG. 4 illustrates an operation example of a piezoelectric jetting device dispensing adhesives on the surface of a laminate exterior case in a dot array form in a secondary battery according to various embodiments.

FIG. 4 illustrates an operation example of a piezoelectric jetting device dispensing adhesives on the surface of a laminate exterior case in a dot array form in a secondary battery according to various embodiments.

As illustrated in FIG. 4, the piezoelectric jetting device 400 may include a body 410 having an inlet pipe 411 provided at one side for inputting the adhesives 130 or adhesive paste, a discharge pipe 412 provided at a lower side for discharging the adhesives 130, a piston 420 coupled to the body 410 to discharge a given amount of the adhesives 130 from the inlet pipe 411 to the discharge pipe 412, and a piezo element 430 coupled to a top portion of the piston 420 to reciprocally actuate the piston 420 in a top-down direction.

Unlike the general adhesive spraying device, the piezoelectric jetting device 400 is configured to accurately dot only predefined regions with a given amount of the adhesives 130, and thus can avoid a problem due to the adhesives 130 contaminating other regions. With the use of the general adhesive spraying device, small grains of sprayed adhesives or cobweb-like or cobweb- or filament-like adhesives may float in the air, which is problematic because of contamination of regions around the electrode assembly.

Figure 5A:
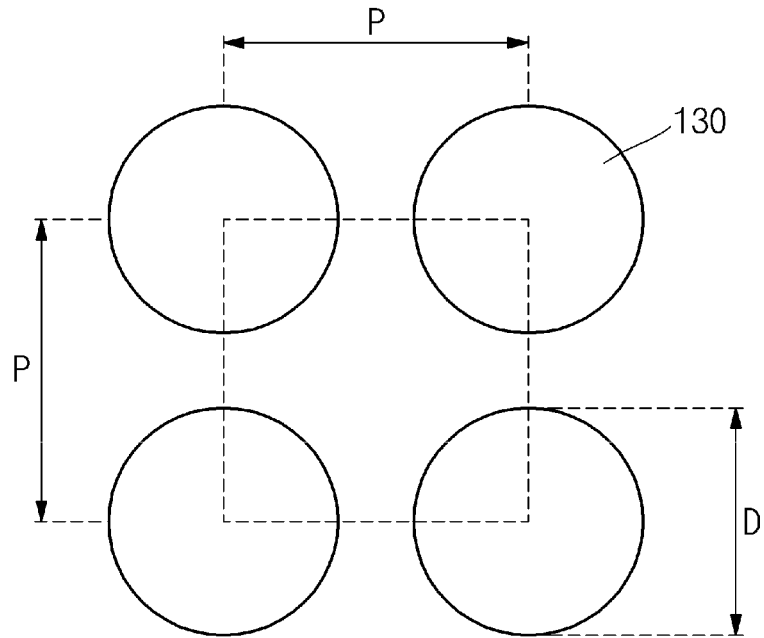
FIGS. 5A and 5B schematically illustrate states before and after compressing a laminate exterior case and an electrode assembly after dispensing adhesives to a surface of a laminate exterior case in a dot array form in a secondary battery according to various embodiments.
Figure 5B:
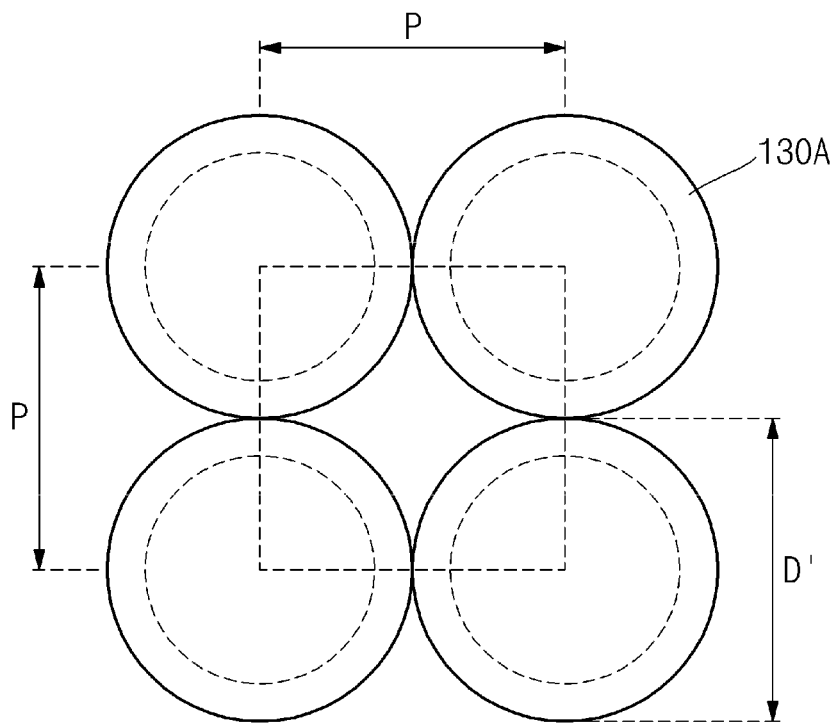

FIGS. 5A and 5B schematically illustrate states before and after compressing a laminate exterior case and an electrode assembly after dispensing adhesives to a surface of the laminate exterior case in a dot array form in a secondary battery according to various embodiments. Here, the yet-to-be compressed adhesives are denoted by reference numeral 130 and the adhesion regions after the compressing are denoted by reference numeral 130A.

As illustrated in FIG. 5A, before compressing the laminate exterior case and the electrode assembly, there are no overlapping regions between the adhesives dotted in substantially circular shapes, which is to prevent or substantially prevent an electrolyte solution from being trapped into the adhesion regions after the compressing. Here, a pitch P between adhesives means a horizontal or vertical distance between the adhesives, and an adhesive dot size D means a diameter of each adhesive before the compressing. In an embodiment, the pitch between the adhesives dispensed in a substantially regular quadrilateral form and a dot array form may be in the range of approximately 1 mm to approximately 5 mm, and the diameter thereof may be in the range of approximately 0.8 mm to approximately 5 mm, which will be further described below.

As illustrated in FIG. 5B, after compressing the laminate exterior case and the electrode assembly to each other, the adhesives may be enlarged (e.g., shaped of circles) to have larger sizes than the initial sizes (areas or diameters), or two, three, or four regions around the adhesives may be spaced a small distance apart from each other or may contact or slightly (or completely) overlap each other (e.g., shaped of deformed circles). Of course, the adhesives having increased sizes after compressing may improve the adhesion strength between the laminate exterior case and the electrode assembly. Here, a pitch P between adhesion regions means a horizontal or vertical distance between the adhesion regions, and a size D' of an adhesion region means a diameter of each adhesion region after the compressing. As illustrated in FIGS. 5A and 5B, while there is no change in the pitch between the adhesives before and after the compressing, the dot size (area or diameter) of each adhesive (or adhesion region) is further increased.

Figure 6A:
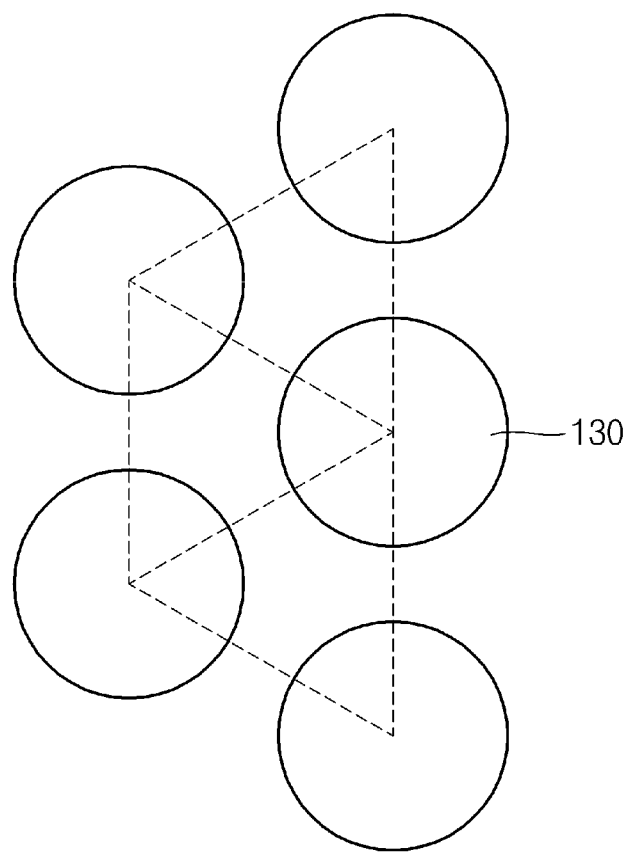
FIGS. 6A and 6B schematically illustrate states before and after compressing a laminate exterior case and an electrode assembly after dispensing adhesives to a surface of a laminate exterior case in a dot array form in a secondary battery according to various embodiments.
Figure 6B:
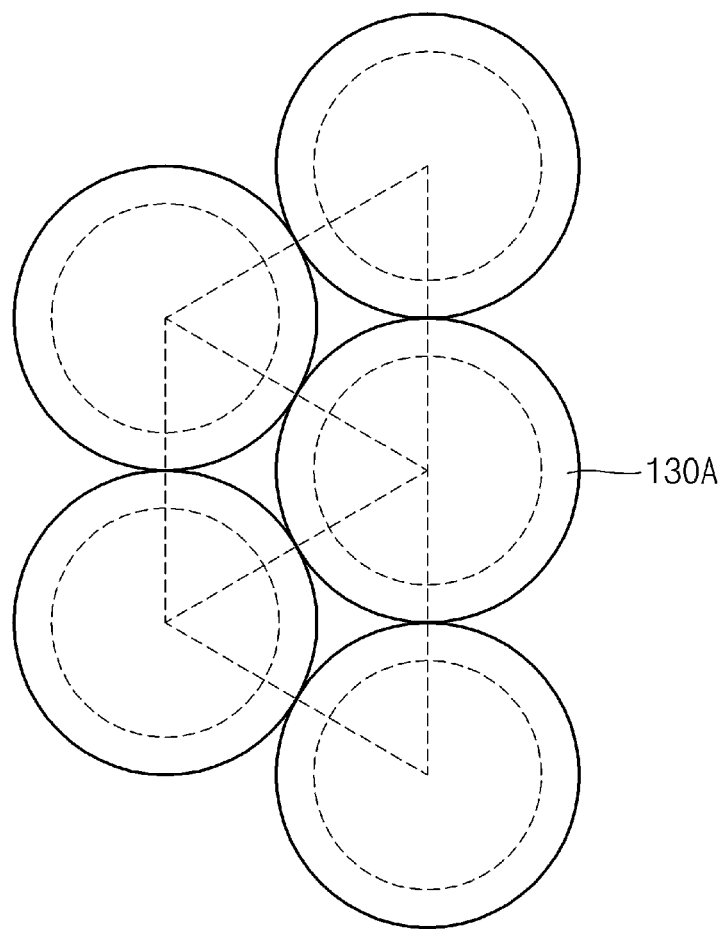

FIGS. 6A and 6B schematically illustrate states before and after compressing a laminate exterior case and an electrode assembly after dispensing adhesives to a surface of the laminate exterior case in a dot array form in a secondary battery according to various embodiments.

As illustrated in FIGS. 6A and 6B, in an embodiment, the pitch between the adhesives dispensed in a zigzag dot array form in which neighboring columns cross each other may be in the range of, for example, approximately 1 mm to approximately 5 mm, and the diameter thereof may be in the range of, for example, approximately 0.8 mm to approximately 5 mm. Assuming that the same pitches are given, after the compressing, the adhesives dispensed in the zigzag dot array form may have an increased area, compared to the adhesives dispensed in a regular quadrilateral dot array form. In some examples, in a case in which the adhesives are dispensed in the zigzag dot array form, more dots can be formed on the same area than in a case in which the adhesives are dispensed in the regular quadrilateral dot array form. That is to say, in a case of the zigzag dot array form, empty spaces between the adhesives after the compressing are more narrowed than in a case of the regular quadrilateral dot array form, thereby securing a more increased area. It is noted that, in FIGS. 5B and 6B, dotted lines indicate dot sizes of the yet-to-be compressed adhesives and solid lines indicate dot sizes of the compressed adhesives.

To this end, as listed in Table 1 below, overlapping rates of yet-to-be compressed adhesives were tested according to dot sizes of and pitches between the adhesives.

In an embodiment, the dot sizes of and the pitches between the adhesives are determined to allow an electrolyte solution to be discharged through spaces between the adhesives during compression. If the pitch between the adhesives is too large or the dot sizes of the adhesives are too small, a required level of adhesion strength between the electrode assembly and the laminate exterior case cannot be secured even though the electrolyte solution can be discharged efficiently.

In an example embodiment, the pitch between the adhesives was set to be in the range of 1 mm to 5 mm, and the dot sizes of the adhesives were set to be in the range of 0.8 mm to 5 mm. In pitch and dot size related data listed in Table 1, positive numbers indicate distances between the adhesives, and negative numbers indicate overlapping distances between the adhesives. The distance or overlapping distance is a horizontal distance, a vertical distance, or a diagonal distance (that is, a distance corresponding to a length of one of four lines forming each quadrangle shown in FIG. 5A or a distance corresponding to a length of a diagonal line of each quadrangle shown in FIG. 6A).

In Table 1, an electrolyte discharge passage may not be provided during compression with the dot sizes and pitches corresponding to regions where the overlapping distances are indicated as negative numbers (that is, lower left regions), and thus the dot sizes and pitches in the ranges stated above may not be used for the adhesives of the present invention.

TABLE 1

| Dot Size [mm] Before com- pression | Pitch [mm] | | | | | | | | |
|---|---|---|---|---|---|---|---|---|---|
| | 1 | 1.5 | 2 | 2.5 | 3 | 3.5 | 4 | 4.5 | 5 |
| 0.8 | 0.2 | 0.7 | 1.2 | 1.7 | 2.2 | 2.7 | 3.2 | 3.7 | 4.2 |
| 0.9 | 0.1 | 0.6 | 1.1 | 1.6 | 2.1 | 2.6 | 3.1 | 3.6 | 4.1 |
| 1 | 0 | 0.5 | 1 | 1.5 | 2 | 2.5 | 3 | 3.5 | 4 |
| 1.1 | −0.1 | 0.4 | 0.9 | 1.4 | 1.9 | 2.4 | 2.9 | 3.4 | 3.9 |
| 1.2 | −0.2 | 0.3 | 0.8 | 1.3 | 1.8 | 2.3 | 2.8 | 3.3 | 3.8 |
| 1.3 | −0.3 | 0.2 | 0.7 | 1.2 | 1.7 | 2.2 | 2.7 | 3.2 | 3.7 |
| 1.4 | −0.4 | 0.1 | 0.6 | 1.1 | 1.6 | 2.1 | 2.6 | 3.1 | 3.6 |
| 1.5 | −0.5 | 0 | 0.5 | 1 | 1.5 | 2 | 2.5 | 3 | 3.5 |
| 1.6 | −0.6 | −0.1 | 0.4 | 0.9 | 1.4 | 1.9 | 2.4 | 2.9 | 3.4 |
| 1.7 | −0.7 | −0.2 | 0.3 | 0.8 | 1.3 | 1.8 | 2.3 | 2.8 | 3.3 |
| 1.8 | −0.8 | −0.3 | 0.2 | 0.7 | 1.2 | 1.7 | 2.2 | 2.7 | 3.2 |
| 1.9 | −0.9 | −0.4 | 0.1 | 0.6 | 1.1 | 1.6 | 2.1 | 2.6 | 3.1 |
| 2 | −1 | −0.5 | 0 | 0.5 | 1 | 1.5 | 2 | 2.5 | 3 |
| 2.1 | −1.1 | −0.6 | −0.1 | 0.4 | 0.9 | 1.4 | 1.9 | 2.4 | 2.9 |
| 2.2 | −1.2 | −0.7 | −0.2 | 0.3 | 0.8 | 1.3 | 1.8 | 2.3 | 2.8 |
| 2.3 | −1.3 | −0.8 | −0.3 | 0.2 | 0.7 | 1.2 | 1.7 | 2.2 | 2.7 |
| 2.4 | −1.4 | −0.9 | −0.4 | 0.1 | 0.6 | 1.1 | 1.6 | 2.1 | 2.6 |

TABLE 1-continued

| Dot Size [mm] Before com- pression | Pitch [mm] | | | | | | | | |
|---|---|---|---|---|---|---|---|---|---|
| | 1 | 1.5 | 2 | 2.5 | 3 | 3.5 | 4 | 4.5 | 5 |
| 2.5 | −1.5 | −1 | −0.5 | 0 | 0.5 | 1 | 1.5 | 2 | 2.5 |
| 2.6 | −1.6 | −1.1 | −0.6 | −0.1 | 0.4 | 0.9 | 1.4 | 1.9 | 2.4 |
| 2.7 | −1.7 | −1.2 | −0.7 | −0.2 | 0.3 | 0.8 | 1.3 | 1.8 | 2.3 |
| 2.8 | −1.8 | −1.3 | −0.8 | −0.3 | 0.2 | 0.7 | 1.2 | 1.7 | 2.2 |
| 2.9 | −1.9 | −1.4 | −0.9 | −0.4 | 0.1 | 0.6 | 1.1 | 1.6 | 2.1 |
| 3 | −2 | −1.5 | −1 | −0.5 | 0 | 0.5 | 1 | 1.5 | 2 |
| 3.1 | −2.1 | −1.6 | −1.1 | −0.6 | −0.1 | 0.4 | 0.9 | 1.4 | 1.9 |
| 3.2 | −2.2 | −1.7 | −1.2 | −0.7 | −0.2 | 0.3 | 0.8 | 1.3 | 1.8 |
| 3.3 | −2.3 | −1.8 | −1.3 | −0.8 | −0.3 | 0.2 | 0.7 | 1.2 | 1.7 |
| 3.4 | −2.4 | −1.9 | −1.4 | −0.9 | −0.4 | 0.1 | 0.6 | 1.1 | 1.6 |
| 3.5 | −2.5 | −2 | −1.5 | −1 | −0.5 | 0 | 0.5 | 1 | 1.5 |
| 3.6 | −2.6 | −2.1 | −1.6 | −1.1 | −0.6 | −0.1 | 0.4 | 0.9 | 1.4 |
| 3.7 | −2.7 | −2.2 | −1.7 | −1.2 | −0.7 | −0.2 | 0.3 | 0.8 | 1.3 |
| 3.8 | −2.8 | −2.3 | −1.8 | −1.3 | −0.8 | −0.3 | 0.2 | 0.7 | 1.2 |
| 3.9 | −2.9 | −2.4 | −1.9 | −1.4 | −0.9 | −0.4 | 0.1 | 0.6 | 1.1 |
| 4 | −3 | −2.5 | −2 | −1.5 | −1 | −0.5 | 0 | 0.5 | 1 |
| 4.1 | −3.1 | −2.6 | −2.1 | −1.6 | −1.1 | −0.6 | −0.1 | 0.4 | 0.9 |
| 4.2 | −3.2 | −2.7 | −2.2 | −1.7 | −1.2 | −0.7 | −0.2 | 0.3 | 0.8 |
| 4.3 | −3.3 | −2.8 | −2.3 | −1.8 | −1.3 | −0.8 | −0.3 | 0.2 | 0.7 |
| 4.4 | −3.4 | −2.9 | −2.4 | −1.9 | −1.4 | −0.9 | −0.4 | 0.1 | 0.6 |
| 4.5 | −3.5 | −3 | −2.5 | −2 | −1.5 | −1 | −0.5 | 0 | 0.5 |
| 4.6 | −3.6 | −3.1 | −2.6 | −2.1 | −1.6 | −1.1 | −0.6 | −0.1 | 0.4 |
| 4.7 | −3.7 | −3.2 | −2.7 | −2.2 | −1.7 | −1.2 | −0.7 | −0.2 | 0.3 |
| 4.8 | −3.8 | −3.3 | −2.8 | −2.3 | −1.8 | −1.3 | −0.8 | −0.3 | 0.2 |
| 4.9 | −3.9 | −3.4 | −2.9 | −2.4 | −1.9 | −1.4 | −0.9 | −0.4 | 0.1 |
| 5 | −4 | −3.5 | −3 | −2.5 | −2 | −1.5 | −1 | −0.5 | 0 |

Meanwhile, after compression, the dot sizes of the compressed adhesives are approximately 1.4 times larger than those of the yet-to-be compressed adhesives (Of course, while the dot sizes vary according to compressing conditions, coating heights, or physical properties of the adhesives, the increasing rate of the dot sizes before and after compression was empirically found to be 1.4 times.), and Table 2 indicates increasing rates expressed in dot size (after compression)/pitch ratios (%). As indicated in Table 2, after compression, the adhesives still have pitches in the range of approximately 1 mm to 5 mm, but equivalent diameters of the adhesives (that is, diameters of the adhesives in case the adhesives shaped of deformed circles turn into ones shaped of original circles) are in the range of approximately 1.12 mm to approximately 7 mm.

In addition, it is empirically known that when an area of the coated adhesives (i.e., an area resulting after compression) is approximately 30% to 40% of the entire area after compression, a predetermined strength of adhesion between the electrode assembly and the laminate exterior case can be secured. Therefore, in Table 2, the regions of less than 30% to 40% in area (i.e., upper right regions) indicate regions where the predetermined strength of adhesion cannot be secured even after compression. In Table 2, the regions of approximately 160% in area (i.e., lower left regions) indicate regions where the adhesives inordinately overlap each other to prevent the electrolyte solution from being discharged.

TABLE 2

| Dot Size [mm] Before compression | Dot Size [mm] After compression | Pitch [mm] 1 | 1.5 | 2 | 2.5 | 3 | 3.5 | 4 | 4.5 | 5 |
|---|---|---|---|---|---|---|---|---|---|---|
| 0.8 | 1.12 | 99% | 44% | 25% | 16% | 11% | 8% | 6% | 5% | 4% |
| 0.9 | 1.26 | 125% | 55% | 31% | 20% | 14% | 10% | 8% | 8% | 5% |
| 1 | 1.4 | 154% | 68% | 38% | 25% | 17% | 13% | 10% | 8% | 6% |
| 1.1 | 1.54 | 186% | 83% | 47% | 30% | 21% | 15% | 12% | 9% | 7% |
| 1.2 | 1.68 | 222% | 99% | 55% | 35% | 25% | 18% | 14% | 11% | 9% |
| 1.3 | 1.82 | 260% | 116% | 65% | 42% | 29% | 21% | 16% | 13% | 10% |
| 1.4 | 1.96 | 302% | 134% | 75% | 48% | 34% | 25% | 19% | 15% | 12% |
| 1.5 | 2.1 | 346% | 154% | 87% | 55% | 38% | 28% | 22% | 17% | 14% |
| 1.6 | 2.24 | 394% | 175% | 99% | 63% | 44% | 32% | 25% | 19% | 16% |
| 1.7 | 2.38 | 445% | 196% | 111% | 71% | 49% | 36% | 28% | 22% | 18% |
| 1.8 | 2.52 | 499% | 222% | 125% | 80% | 55% | 41% | 31% | 25% | 20% |
| 1.9 | 2.66 | 556% | 247% | 139% | 89% | 62% | 45% | 35% | 27% | 22% |
| 2 | 2.8 | 616% | 274% | 154% | 99% | 68% | 50% | 38% | 30% | 25% |
| 2.1 | 2.94 | 679% | 302% | 170% | 109% | 75% | 55% | 42% | 34% | 27% |
| 2.2 | 3.08 | 745% | 331% | 186% | 119% | 83% | 61% | 47% | 37% | 30% |
| 2.3 | 3.22 | 814% | 362% | 204% | 130% | 90% | 66% | 51% | 40% | 33% |
| 2.4 | 3.36 | 887% | 394% | 222% | 142% | 99% | 72% | 55% | 44% | 35% |
| 2.5 | 3.5 | 962% | 428% | 241% | 154% | 107% | 79% | 60% | 48% | 38% |
| 2.6 | 3.64 | 1041% | 462% | 260% | 166% | 116% | 85% | 65% | 51% | 42% |
| 2.7 | 3.78 | 1122% | 499% | 281% | 180% | 125% | 92% | 70% | 55% | 45% |
| 2.8 | 3.92 | 1207% | 536% | 302% | 193% | 134% | 99% | 75% | 60% | 48% |
| 2.9 | 4.06 | 1295% | 575% | 324% | 207% | 144% | 108% | 81% | 64% | 52% |
| 3 | 4.2 | 1385% | 616% | 346% | 222% | 154% | 113% | 87% | 68% | 55% |
| 3.1 | 4.34 | 1479% | 657% | 370% | 237% | 164% | 121% | 92% | 73% | 59% |
| 3.2 | 4.48 | 1576% | 701% | 394% | 252% | 175% | 129% | 99% | 78% | 63% |
| 3.3 | 4.62 | 1676% | 745% | 419% | 268% | 186% | 137% | 105% | 83% | 67% |
| 3.4 | 4.76 | 1780% | 791% | 445% | 285% | 198% | 145% | 111% | 88% | 71% |
| 3.5 | 4.9 | 1886% | 838% | 471% | 302% | 210% | 154% | 118% | 93% | 75% |
| 3.6 | 5.04 | 1995% | 887% | 499% | 319% | 222% | 163% | 125% | 99% | 80% |
| 3.7 | 5.18 | 2107% | 937% | 527% | 337% | 234% | 172% | 132% | 104% | 84% |
| 3.8 | 5.32 | 2223% | 988% | 556% | 356% | 247% | 181% | 139% | 110% | 89% |
| 3.9 | 5.46 | 2341% | 1041% | 585% | 375% | 260% | 191% | 146% | 116% | 94% |
| 4 | 5.6 | 2463% | 1095% | 616% | 394% | 274% | 201% | 154% | 122% | 99% |
| 4.1 | 5.74 | 2586% | 1150% | 647% | 414% | 288% | 211% | 162% | 128% | 104% |
| 4.2 | 5.89 | 2715% | 1207% | 679% | 434% | 302% | 222% | 170% | 134% | 108% |
| 4.3 | 6.02 | 2846% | 1265% | 712% | 455% | 316% | 232% | 178% | 141% | 114% |
| 4.4 | 6.16 | 2980% | 1325% | 745% | 477% | 331% | 243% | 186% | 147% | 119% |
| 4.5 | 6.3 | 3117% | 1385% | 779% | 499% | 346% | 254% | 195% | 154% | 125% |
| 4.6 | 6.44 | 3257% | 1448% | 814% | 521% | 362% | 266% | 204% | 161% | 130% |
| 4.7 | 6.56 | 3400% | 1511% | 850% | 544% | 378% | 278% | 213% | 168% | 136% |
| 4.8 | 6.72 | 3547% | 1576% | 887% | 567% | 394% | 290% | 222% | 175% | 142% |
| 4.9 | 6.86 | 3696% | 1643% | 924% | 591% | 411% | 302% | 231% | 183% | 148% |
| 5 | 7 | 3848% | 1710% | 962% | 616% | 428% | 314% | 241% | 190% | 154% |

Next, the sizes and pitches of the adhesives, in which electrolyte discharge passages can be secured during compression and the predetermined adhesion strength can be secured after compression, as indicated in Tables 3 and 4, may be determined by collectively analyzing the data listed in Tables 1 and 2. Here, Table 3 indicates dot size/pitch ratios of the adhesives before compression, and Table 4 indicates dot size/pitch ratios of the adhesives after compression. In each of Tables 3 and 4, central regions between the lower left regions and upper right regions indicate dot sizes and pitches of the adhesives which may be used according to one or more embodiments of the present invention.

TABLE 3

| Dot Size [mm] Before compression | Dot Size [mm] After compression | Pitch [mm] 1 | 1.5 | 2 | 2.5 | 3 | 3.5 | 4 | 4.5 | 5 |
|---|---|---|---|---|---|---|---|---|---|---|
| 0.8 | 1.12 | 0.8 | 0.5 | 0.4 | 0.3 | 0.3 | 0.2 | 0.2 | 0.2 | 0.2 |
| 0.9 | 1.26 | 0.9 | 0.6 | 0.5 | 0.4 | 0.3 | 0.3 | 0.2 | 0.2 | 0.2 |
| 1 | 1.4 | 1.0 | 0.7 | 0.5 | 0.4 | 0.3 | 0.3 | 0.3 | 0.2 | 0.2 |
| 1.1 | 1.54 | 1.1 | 0.7 | 0.6 | 0.4 | 0.4 | 0.3 | 0.3 | 0.2 | 0.2 |
| 1.2 | 1.68 | 1.2 | 0.8 | 0.6 | 0.5 | 0.4 | 0.3 | 0.3 | 0.3 | 0.2 |
| 1.3 | 1.82 | 1.3 | 0.9 | 0.7 | 0.5 | 0.4 | 0.4 | 0.3 | 0.3 | 0.3 |
| 1.4 | 1.96 | 1.4 | 0.9 | 0.7 | 0.6 | 0.5 | 0.4 | 0.4 | 0.3 | 0.3 |
| 1.5 | 2.1 | 1.5 | 1.0 | 0.8 | 0.6 | 0.5 | 0.4 | 0.4 | 0.3 | 0.3 |
| 1.6 | 2.24 | 1.6 | 1.1 | 0.8 | 0.6 | 0.5 | 0.5 | 0.4 | 0.4 | 0.3 |
| 1.7 | 2.38 | 1.7 | 1.1 | 0.9 | 0.7 | 0.6 | 0.5 | 0.4 | 0.4 | 0.3 |

TABLE 3-continued

| Dot Size [mm] | | Pitch [mm] | | | | | | | | |
|---|---|---|---|---|---|---|---|---|---|---|
| Before compression | After compression | 1 | 1.5 | 2 | 2.5 | 3 | 3.5 | 4 | 4.5 | 5 |
| 1.8 | 2.52 | 1.8 | 1.2 | 0.9 | 0.7 | 0.6 | 0.5 | 0.5 | 0.4 | 0.4 |
| 1.9 | 2.66 | 1.9 | 1.3 | 1.0 | 0.8 | 0.6 | 0.5 | 0.5 | 0.4 | 0.4 |
| 2 | 2.8 | 2.0 | 1.3 | 1.0 | 0.8 | 0.7 | 0.6 | 0.5 | 0.4 | 0.4 |
| 2.1 | 2.94 | 2.1 | 1.4 | 1.1 | 0.8 | 0.7 | 0.6 | 0.5 | 0.5 | 0.4 |
| 2.2 | 3.08 | 2.2 | 1.5 | 1.1 | 0.9 | 0.7 | 0.6 | 0.6 | 0.5 | 0.4 |
| 2.3 | 3.22 | 2.3 | 1.5 | 1.2 | 0.9 | 0.8 | 0.7 | 0.6 | 0.5 | 0.5 |
| 2.4 | 3.36 | 2.4 | 1.6 | 1.2 | 1.0 | 0.8 | 0.7 | 0.6 | 0.5 | 0.5 |
| 2.5 | 3.5 | 2.5 | 1.7 | 1.3 | 1.0 | 0.8 | 0.7 | 0.6 | 0.6 | 0.5 |
| 2.6 | 3.64 | 2.6 | 1.7 | 1.3 | 1.0 | 0.9 | 0.7 | 0.7 | 0.6 | 0.5 |
| 2.7 | 3.78 | 2.7 | 1.8 | 1.4 | 1.1 | 0.9 | 0.8 | 0.7 | 0.6 | 0.5 |
| 2.8 | 3.92 | 2.8 | 1.9 | 1.4 | 1.1 | 0.9 | 0.8 | 0.7 | 0.6 | 0.6 |
| 2.9 | 4.06 | 2.9 | 1.9 | 1.5 | 1.2 | 1.0 | 0.8 | 0.7 | 0.6 | 0.6 |
| 3 | 4.2 | 3.0 | 2.0 | 1.5 | 1.2 | 1.0 | 0.9 | 0.8 | 0.7 | 0.6 |
| 3.1 | 4.34 | 3.1 | 2.1 | 1.6 | 1.2 | 1.0 | 0.9 | 0.8 | 0.7 | 0.6 |
| 3.2 | 4.48 | 3.2 | 2.1 | 1.6 | 1.3 | 1.1 | 0.9 | 0.8 | 0.7 | 0.6 |
| 3.3 | 4.62 | 3.3 | 2.2 | 1.7 | 1.3 | 1.1 | 0.9 | 0.8 | 0.7 | 0.7 |
| 3.4 | 4.76 | 3.4 | 2.3 | 1.7 | 1.4 | 1.1 | 1.0 | 0.9 | 0.8 | 0.7 |
| 3.5 | 4.9 | 3.5 | 2.3 | 1.8 | 1.4 | 1.2 | 1.0 | 0.9 | 0.8 | 0.7 |
| 3.6 | 5.04 | 3.6 | 2.4 | 1.8 | 1.4 | 1.2 | 1.0 | 0.9 | 0.8 | 0.7 |
| 3.7 | 5.18 | 3.7 | 2.5 | 1.9 | 1.5 | 1.2 | 1.1 | 0.9 | 0.8 | 0.7 |
| 3.8 | 5.32 | 3.8 | 2.5 | 1.9 | 1.5 | 1.3 | 1.1 | 1.0 | 0.8 | 0.8 |
| 3.9 | 5.46 | 3.9 | 2.6 | 2.0 | 1.6 | 1.3 | 1.1 | 1.0 | 0.9 | 0.8 |
| 4 | 5.6 | 4.0 | 2.7 | 2.0 | 1.6 | 1.3 | 1.1 | 1.0 | 0.9 | 0.8 |
| 4.1 | 5.74 | 4.1 | 2.7 | 2.1 | 1.6 | 1.4 | 1.2 | 1.0 | 0.9 | 0.8 |
| 4.2 | 5.88 | 4.2 | 2.8 | 2.1 | 1.7 | 1.4 | 1.2 | 1.1 | 0.9 | 0.8 |
| 4.3 | 6.02 | 4.3 | 2.9 | 2.2 | 1.7 | 1.4 | 1.2 | 1.1 | 1.0 | 0.9 |
| 4.4 | 6.16 | 4.4 | 2.9 | 2.2 | 1.8 | 1.5 | 1.3 | 1.1 | 1.0 | 0.9 |
| 4.5 | 6.3 | 4.5 | 3.0 | 2.3 | 1.8 | 1.5 | 1.3 | 1.1 | 1.0 | 0.9 |
| 4.6 | 6.44 | 4.6 | 3.1 | 2.3 | 1.8 | 1.5 | 1.3 | 1.2 | 1.0 | 0.9 |
| 4.7 | 6.58 | 4.7 | 3.1 | 2.4 | 1.9 | 1.6 | 1.3 | 1.2 | 1.0 | 0.9 |
| 4.8 | 6.72 | 4.8 | 3.2 | 2.4 | 1.9 | 1.6 | 1.4 | 1.2 | 1.1 | 1.0 |
| 4.9 | 6.86 | 4.9 | 3.3 | 2.5 | 2.0 | 1.6 | 1.4 | 1.2 | 1.1 | 1.0 |
| 5 | 7 | 5.0 | 3.3 | 2.5 | 2.0 | 1.7 | 1.4 | 1.3 | 1.1 | 1.0 |

TABLE 4

| Dot Size [mm] | | Pitch [mm] | | | | | | | | |
|---|---|---|---|---|---|---|---|---|---|---|
| Before compression | After compression | 1 | 1.5 | 2 | 2.5 | 3 | 3.5 | 4 | 4.5 | 5 |
| 0.8 | 1.12 | 1.1 | 0.7 | 0.6 | 0.4 | 0.4 | 0.3 | 0.3 | 0.2 | 0.2 |
| 0.9 | 1.26 | 1.3 | 0.8 | 0.6 | 0.5 | 0.4 | 0.4 | 0.3 | 0.3 | 0.3 |
| 1 | 1.4 | 1.4 | 0.9 | 0.7 | 0.6 | 0.5 | 0.4 | 0.4 | 0.3 | 0.3 |
| 1.1 | 1.54 | 1.5 | 1.0 | 0.8 | 0.6 | 0.5 | 0.4 | 0.4 | 0.3 | 0.3 |
| 1.2 | 1.68 | 1.7 | 1.1 | 0.8 | 0.7 | 0.6 | 0.5 | 0.4 | 0.4 | 0.3 |
| 1.3 | 1.82 | 1.8 | 1.2 | 0.9 | 0.7 | 0.6 | 0.5 | 0.5 | 0.4 | 0.4 |
| 1.4 | 1.96 | 2.0 | 1.3 | 1.0 | 0.8 | 0.7 | 0.6 | 0.5 | 0.4 | 0.4 |
| 1.5 | 2.1 | 2.1 | 1.4 | 1.1 | 0.8 | 0.7 | 0.6 | 0.5 | 0.5 | 0.4 |
| 1.6 | 2.24 | 2.2 | 1.5 | 1.1 | 0.9 | 0.8 | 0.6 | 0.6 | 0.5 | 0.4 |
| 1.7 | 2.36 | 2.4 | 1.6 | 1.2 | 1.0 | 0.8 | 0.7 | 0.6 | 0.5 | 0.5 |
| 1.8 | 2.52 | 2.5 | 1.7 | 1.3 | 1.0 | 0.8 | 0.7 | 0.6 | 0.6 | 0.5 |
| 1.9 | 2.66 | 2.7 | 1.8 | 1.3 | 1.1 | 0.9 | 0.8 | 0.7 | 0.6 | 0.5 |
| 2 | 2.8 | 2.8 | 1.9 | 1.4 | 1.1 | 0.9 | 0.8 | 0.7 | 0.6 | 0.6 |
| 2.1 | 2.94 | 2.9 | 2.0 | 1.5 | 1.2 | 1.0 | 0.8 | 0.7 | 0.7 | 0.6 |
| 2.2 | 3.06 | 3.1 | 2.1 | 1.5 | 1.2 | 1.0 | 0.9 | 0.8 | 0.7 | 0.6 |
| 2.3 | 3.22 | 3.2 | 2.1 | 1.6 | 1.3 | 1.1 | 0.9 | 0.8 | 0.7 | 0.6 |
| 2.4 | 3.36 | 3.4 | 2.2 | 1.7 | 1.3 | 1.1 | 1.0 | 0.8 | 0.7 | 0.7 |
| 2.5 | 3.5 | 3.5 | 2.3 | 1.8 | 1.4 | 1.2 | 1.0 | 0.9 | 0.8 | 0.7 |
| 2.6 | 3.64 | 3.6 | 2.4 | 1.8 | 1.5 | 1.2 | 1.0 | 0.9 | 0.8 | 0.7 |
| 2.7 | 3.78 | 3.8 | 2.5 | 1.9 | 1.5 | 1.3 | 1.1 | 0.9 | 0.8 | 0.8 |
| 2.8 | 3.92 | 3.9 | 2.6 | 2.0 | 1.6 | 1.3 | 1.1 | 1.0 | 0.9 | 0.8 |
| 2.9 | 4.06 | 4.1 | 2.7 | 2.0 | 1.6 | 1.4 | 1.2 | 1.0 | 0.9 | 0.8 |
| 3 | 4.2 | 4.2 | 2.8 | 2.1 | 1.7 | 1.4 | 1.2 | 1.1 | 0.9 | 0.8 |
| 3.1 | 4.34 | 4.3 | 2.9 | 2.2 | 1.7 | 1.4 | 1.2 | 1.1 | 1.0 | 0.9 |
| 3.2 | 4.46 | 4.5 | 3.0 | 2.2 | 1.8 | 1.5 | 1.3 | 1.1 | 1.0 | 0.9 |
| 3.3 | 4.62 | 4.6 | 3.1 | 2.3 | 1.8 | 1.5 | 1.3 | 1.2 | 1.0 | 0.9 |
| 3.4 | 4.76 | 4.8 | 3.2 | 2.4 | 1.9 | 1.6 | 1.4 | 1.2 | 1.1 | 1.0 |
| 3.5 | 4.9 | 4.9 | 3.3 | 2.5 | 2.0 | 1.6 | 1.4 | 1.2 | 1.1 | 1.0 |

TABLE 4-continued

| Dot Size [mm] | | Pitch [mm] | | | | | | | | |
| Before compression | After compression | 1 | 1.5 | 2 | 2.5 | 3 | 3.5 | 4 | 4.5 | 5 |
| --- | --- | --- | --- | --- | --- | --- | --- | --- | --- | --- |
| 3.6 | 5.04 | 5.0 | 3.4 | 2.5 | 2.0 | 1.7 | 1.4 | 1.3 | 1.1 | 1.0 |
| 3.7 | 5.18 | 5.2 | 3.5 | 2.6 | 2.1 | 1.7 | 1.5 | 1.3 | 1.2 | 1.0 |
| 3.8 | 5.32 | 5.3 | 3.5 | 2.7 | 2.1 | 1.8 | 1.5 | 1.3 | 1.2 | 1.1 |
| 3.9 | 5.46 | 5.5 | 3.6 | 2.7 | 2.2 | 1.8 | 1.6 | 1.4 | 1.2 | 1.1 |
| 4 | 5.6 | 5.6 | 3.7 | 2.8 | 2.2 | 1.9 | 1.6 | 1.4 | 1.2 | 1.1 |
| 4.1 | 5.74 | 5.7 | 3.8 | 2.9 | 2.3 | 1.9 | 1.6 | 1.4 | 1.3 | 1.1 |
| 4.2 | 5.88 | 5.9 | 3.9 | 2.9 | 2.4 | 2.0 | 1.7 | 1.5 | 1.3 | 1.2 |
| 4.3 | 6.02 | 6.0 | 4.0 | 3.0 | 2.4 | 2.0 | 1.7 | 1.5 | 1.3 | 1.2 |
| 4.4 | 6.16 | 6.2 | 4.1 | 3.1 | 2.5 | 2.1 | 1.8 | 1.5 | 1.4 | 1.2 |
| 4.5 | 6.3 | 6.3 | 4.2 | 3.2 | 2.5 | 2.1 | 1.8 | 1.6 | 1.4 | 1.3 |
| 4.6 | 6.44 | 6.4 | 4.3 | 3.2 | 2.6 | 2.1 | 1.8 | 1.6 | 1.4 | 1.3 |
| 4.7 | 6.58 | 6.6 | 4.4 | 3.3 | 2.6 | 2.2 | 1.9 | 1.6 | 1.5 | 1.3 |
| 4.8 | 6.72 | 6.7 | 4.5 | 3.4 | 2.7 | 2.2 | 1.9 | 1.7 | 1.5 | 1.3 |
| 4.9 | 6.86 | 6.9 | 4.6 | 3.4 | 2.7 | 2.3 | 2.0 | 1.7 | 1.5 | 1.4 |
| 5 | 7 | 7.0 | 4.7 | 3.5 | 2.8 | 2.3 | 2.0 | 1.8 | 1.6 | 1.4 |

As such, according to various embodiments of the present invention, for an adhesive pitch of 1 mm, the adhesive dot size/pitch ratio is 0.8 to 1.0 when the dot sizes of the yet-to-be compressed adhesives are in the range of 0.8 mm to 1 mm. For an adhesive pitch of 1.5 mm, the adhesive dot size/pitch ratio is 0.5 to 1.0 when the dot sizes of the yet-to-be compressed adhesives are in the range of 0.8 mm to 1.5 mm. For an adhesive pitch of 2 mm, the adhesive dot size/pitch ratio is 0.6 to 1.0 when the dot sizes of the yet-to-be compressed adhesives are in the range of 1.1 mm to 2 mm. For an adhesive pitch of 2.5 mm, the adhesive dot size/pitch ratio is 0.5 to 1.0 when the dot sizes of the yet-to-be compressed adhesives are in the range of 1.3 mm to 2.5 mm. For an adhesive pitch of 3 mm, the adhesive dot size/pitch ratio is 0.5 to 1.0 when the dot sizes of the yet-to-be compressed adhesives are in the range of 1.6 mm to 3 mm. For an adhesive pitch of 3.5 mm, the adhesive dot size/pitch ratio is 0.5 to 1.0 when the dot sizes of the yet-to-be compressed adhesives are in the range of 1.8 mm to 3.5 mm. For an adhesive pitch of 4 mm, the adhesive dot size/pitch ratio is 0.5 to 1.0 when the dot sizes of the yet-to-be compressed adhesives are in the range of 2.1 mm to 4 mm. For an adhesive pitch of 4.5 mm, the adhesive dot size/pitch ratio is 0.5 to 1.0 when the dot sizes of the yet-to-be compressed adhesives are in the range of 2.3 mm to 4.5 mm. For an adhesive pitch of 5 mm, the adhesive dot size/pitch ratio is 0.5 to 1.0 when the dot sizes of the yet-to-be compressed adhesives are in the range of 2.6 mm to 5 mm. That is to say, when the adhesives are dispensed in the dot array form so as to have dot sizes and pitches in the ranges stated above, the electrolyte discharge passage is provided during compression, thereby securing a desired level of adhesion strength (peel strength) after compressing the adhesives without trapping of the electrolyte solution after compression.

According to various embodiments of the present invention, for an adhesive pitch of 1 mm, the adhesive dot size/pitch ratio is 1.1 to 1.4 when the dot sizes of the compressed adhesives are in the range of 1.12 mm to 1.4 mm. For an adhesive pitch of 1.5 mm, the adhesive dot size/pitch ratio is 0.7 to 1.4 when the dot sizes of the compressed adhesives are in the range of 1.12 mm to 2.1 mm. For an adhesive pitch of 2 mm, the adhesive dot size/pitch ratio is 0.8 to 1.4 when the dot sizes of the compressed adhesives are in the range of 1.54 mm to 2.8 mm. For an adhesive pitch of 2.5 mm, the adhesive dot size/pitch ratio is 0.7 to 1.4 when the dot sizes of the compressed adhesives are in the range of 1.82 mm to 3.5 mm. For an adhesive pitch of 3 mm, the adhesive dot size/pitch ratio is 0.7 to 1.4 when the dot sizes of the compressed adhesives are in the range of 2.24 mm to 4.2 mm. For an adhesive pitch of 3.5 mm, the adhesive dot size/pitch ratio is 0.7 to 1.4 when the dot sizes of the compressed adhesives are in the range of 2.52 mm to 4.9 mm. For an adhesive pitch of 4 mm, the adhesive dot size/pitch ratio is 0.7 to 1.4 when the dot sizes of the compressed adhesives are in the range of 3.22 mm to 5.6 mm. For an adhesive pitch of 4.5 mm, the adhesive dot size/pitch ratio is 0.7 to 1.4 when the dot sizes of the compressed adhesives are in the range of 3.22 mm to 6.3 mm. For an adhesive pitch of 5 mm, the adhesive dot size/pitch ratio is 0.7 to 1.4 when the dot sizes of the compressed adhesives are in the range of 3.64 mm to 7 mm.

As indicated in Table 5, according to embodiments of the present invention, when the adhesives are dispensed to the first insulation layer of the laminate exterior case to a thickness of approximately 5 μm in the dot array form by a piezoelectric jetting process, the measured peel strength was approximately 491 gf/25 mm. That is to say, the peel strength between the laminate exterior case and the electrode assembly was approximately 491 gf/25 mm. However, in a case of using a conventional tape, such as OPS (Oriented Polystyrene) or a hot melt, like in Comparative Examples 1 to 4, the measured peel strength was approximately 78 gf/25 mm to approximately 94 gf/25 mm. Therefore, when the adhesives are dispensed to a surface of the laminate exterior case in the dot array form according to the embodiments of the present invention, the obtained peel strength was highest.

In addition, as described above, as the adhesive dot sizes and pitches are adjusted, the peel strength between the electrode assembly and the laminate exterior case varied in the range of approximately 300 gf/25 mm to approximately 2500 gf/25 mm.

The peel strength is a value measured when the laminate exterior case and the electrode assembly are separated from each other by pulling the laminate exterior case and the electrode assembly after the laminate exterior case and the electrode assembly are adhered to each other using the adhesives or the finishing tape in opposite directions.

TABLE 5

| | DOE No. | Area | Finishing type | Peel strength AVR |
|---|---|---|---|---|
| Tape | Comparative Example 1 | 21*80.5 (51%) | OPS 45 | 78 |
| Tape | Comparative Example 2 | 21*80.5 (51%) | OPS 45 | 94 |
| Tape | Comparative Example 3 | 21*80.5 (51%) | Hot Melt 35 | 94 |
| Tape | Comparative Example 4 | 21*45 (29%) | OPS 56 | 87 |
| Piezo jetting | Example | 30*70 (64%) | Adhesives (5 μm) | 491 |

Figure 7:
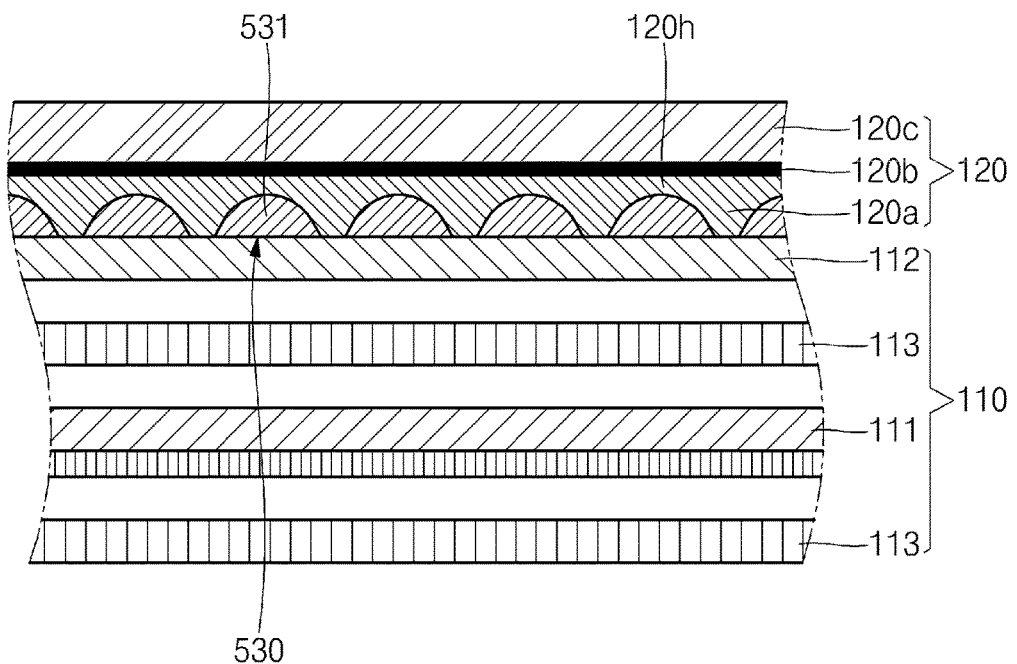
FIG. 7 is a partially cross-sectional view illustrating a state in which a laminate exterior case and an electrode assembly are adhered to each other in a secondary battery according to various embodiments.

FIG. 7 is a partially cross-sectional view illustrating a state in which a laminate exterior case and an electrode assembly are adhered to each other in a secondary battery according to various embodiments.

As illustrated in FIG. 7, adhesives 530 may each include an anchoring part 531 coupled to the first insulation layer 120a of the laminate exterior case 120. That is to say, each of the adhesives 530 may further include the anchoring part 531 coupled to a groove 120h formed in the first insulation layer 120a. In other words, the anchoring part 531 of each adhesive 530 penetrates into the first insulation layer 120a to a given depth to then be coupled to the first insulation layer 120a, thereby further improving a coupling capacity with respect to the first insulation layer 120a.

In addition, the adhesives 530 may have a smaller thickness than the first insulation layer 120a. In addition, the thickness occupied by the adhesives 530 between the laminate exterior case 120 (i.e., the bottom surface of the first insulation layer 120a) and the electrode assembly 110 (i.e., the top surface of the electrode assembly) is practically nil or may be extremely small, and thus some regions of the top surface of the electrode assembly 110 may be adhered to the adhesives 530 and some other regions of the top surface of the electrode assembly 110 may be brought into close contact with the first insulation layer 120a. Accordingly, a secondary battery having such a configuration may not undergo an increase in the thickness.

Similarly, although not shown, the sealing portion 124 may also include adhesives 530 each including the anchoring part 531 and coupled to the first insulation layer 120a.

As described above, the adhesives 530 are coupled to the first insulation layer 120a of the laminate exterior case 120 through the anchoring part 531, and thus the diameters or sizes of the adhesives 530 may not be changed when the laminate exterior case 120 and the electrode assembly 120 are compressed. That is to say, as illustrated in FIGS. 5A and 5B and FIGS. 6A and 6B, there is a change in the diameters or sizes of the adhesives 130 before and after compression. However, as illustrated in FIG. 7, since the adhesives 530 coupled to the first insulation layer 120a of the laminate exterior case 120 through the anchoring part 531 have no regions protruding to the exterior of the first insulation layer 120a, and thus there is no change in the diameters or sizes of the adhesives 530 before and after compression. Therefore, the secondary battery may undergo no change in the size of the adhesives 530 in the course of manufacturing the same, thereby suppressing failures due to a change in the size of the adhesives occurring during the manufacture.

FIGS. 8A to 8D are schematic views sequentially illustrating a manufacturing method for a secondary battery according to various embodiments.

The manufacturing method of a secondary battery according to one or more embodiments may include a pouch exterior case preparing step, a pouch exterior case forming step, an adhesive dotting step, a pouch exterior case sealing and compressing step.

Figure 8A:
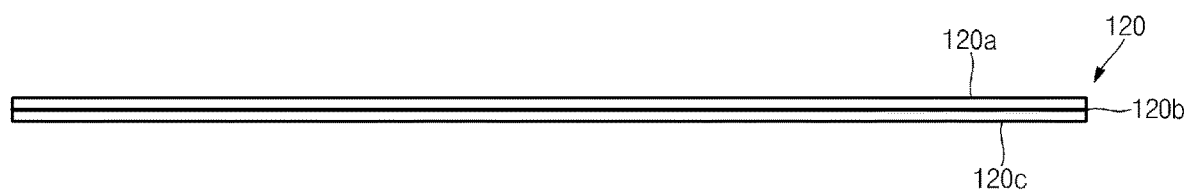
FIGS. 8A to 8D are schematic views sequentially illustrating a manufacturing method for a secondary battery according to various embodiments.

As illustrated in FIG. 8A, in the pouch exterior case preparing step, a substantially planar pouch exterior case 120, including a first insulation layer 120a, a metal layer 120b and a second insulation layer 120c, is prepared. Here, the first insulation layer 120a may face upward, and the second insulation layer 120c may face downward. Of course, the metal layer 120b may be located between the first insulation layer 120a and the second insulation layer 120c.

Figure 8B:
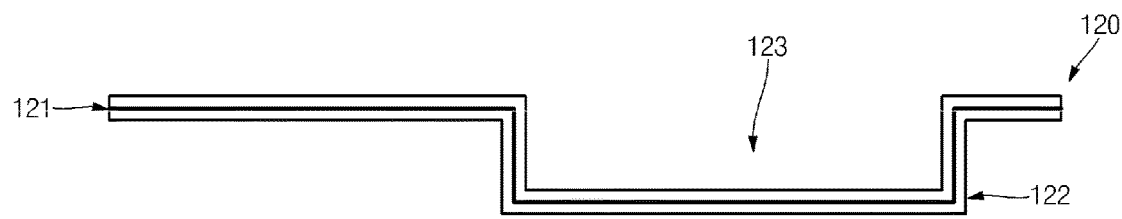

As illustrated in FIG. 8B, in the pouch exterior case forming step, at least one recess 123 is formed in some regions of the pouch exterior case 120 using a mold or a press so as to allow the pouch exterior case 120 to accommodate the electrode assembly 110.

Here, some regions of the pouch exterior case 120 are maintained at a planar state (that is, to be defined as the first exterior case portion 121), and some other regions are formed to become the recesses 123 (that is, to be defined as the second exterior case portion 122).

Figure 8C:
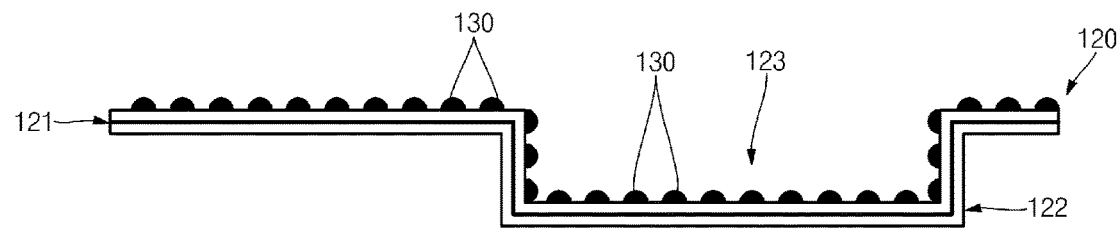

As illustrated in FIG. 8C, in the adhesive dotting step, the adhesives 130 may be dispensed on the planar regions of the pouch exterior case 120 (that is, the first exterior case portion 121) and/or the recess 123 (inclusive of the second exterior case portion 122) in a dot array form or a matrix form by a piezoelectric jetting process. After the dispensing of the adhesives 130, the adhesives 130 are dried, and thus a contamination problem due to the adhesives 130 can be avoided in a subsequent process. That is to say, once the adhesives 130 are dried, adhesion characteristics are not exhibited until the adhesives 130 are melted again.

Figure 8D:
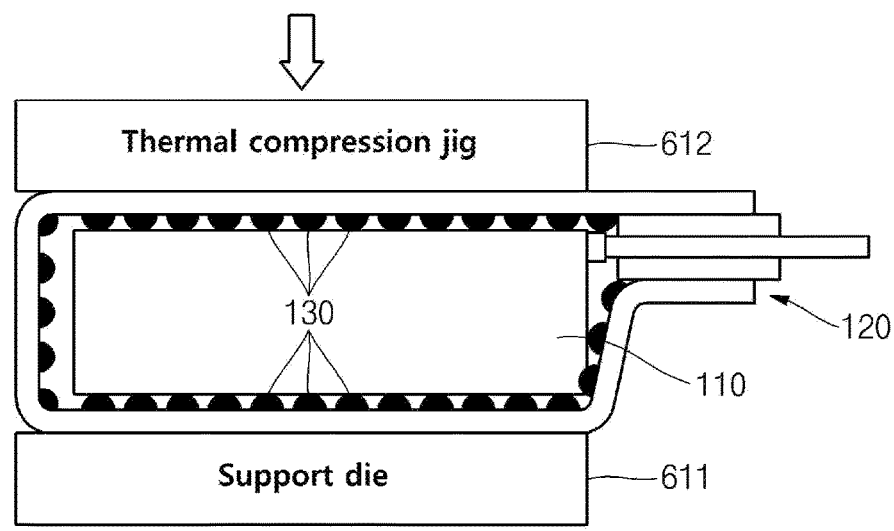

As illustrated in FIG. 8D, in the pouch exterior case sealing and compressing step, the electrode assembly 110 is accommodated in the recess 123 of the pouch exterior case 120 and then sealed, followed by thermally compressing the pouch exterior case 120 and the electrode assembly 110, thereby allowing the adhesives 130 to adhere the pouch exterior case 120 and the electrode assembly 110 to each other.

Here, the adhesives 130 are melted by the thermally compressing, and then cooled to be hardened, and thus the adhesives 130 adhere the pouch exterior case 120 and the electrode assembly 110 to each other.

In addition, the adhesives 130 dispensed on the pouch exterior case 120 are formed over an area substantially equal to or greater than that of the top and bottom surfaces of the electrode assembly 110. Thus, during thermal compression using a support die 611 and/or a thermal compression jig 612, the pressure applied may not concentrate on a given region but may be uniformly applied to the overall areas of the top and bottom surfaces of the electrode assembly 110, thereby preventing a particular region of the electrode assembly 110 from being inordinately compressed during the thermal compression. Therefore, the life characteristics of the electrode assembly 110 may not deteriorated, and thus the lifetime of the secondary battery is not shortened.

As described above, in the embodiments of the present invention, the pouch exterior case 120 is first formed in a predetermined shaped, and the adhesives 130 are then dispensed on the surface thereof, and thus the adhesives 130 can be formed at more accurate positions or regions.

Figure 9A:
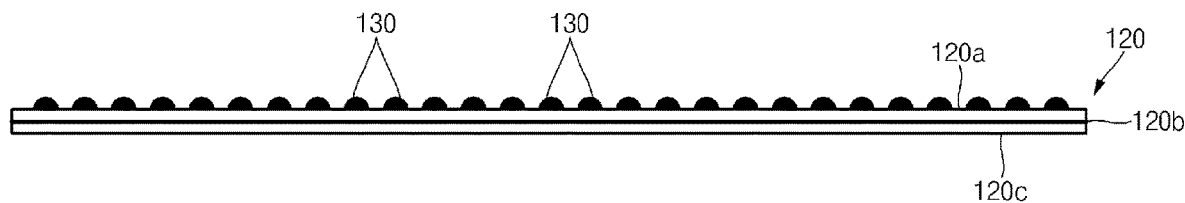
FIGS. 9A and 9B are schematic views sequentially illustrating a manufacturing method for a secondary battery according to various embodiments.
Figure 9B:
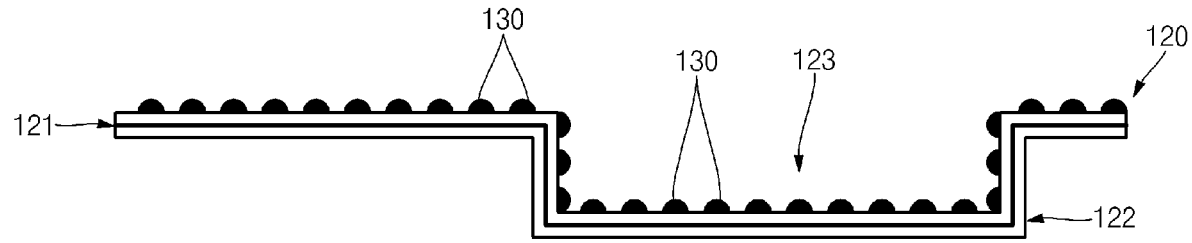

FIGS. 9A and 9B are schematic views sequentially illustrating a manufacturing method for a secondary battery according to various embodiments.

As illustrated in FIG. 9A, after preparing the planar pouch exterior case 120, the adhesives 130 may be dispensed on the pouch exterior case 120 in a dot array form or in a matrix form by a piezoelectric jetting process. After the dispensing of the adhesives 130, the adhesives 130 are dried, and thus a contamination problem due to the adhesives 130 can be avoided in a subsequent process.

Here, the adhesives 130 may be formed on, for example, only predefined regions or the overall region of the pouch exterior case 120 corresponding to the top surface and/or the bottom surface of the electrode assembly.

As illustrated in FIG. 9B, in the pouch exterior case forming step, at least one recess 123 is formed in some regions of the pouch exterior case 120 so as to allow the pouch exterior case 120 to accommodate the electrode assembly 110.

Here, some regions of the pouch exterior case 120 are maintained at a planar state (that is, the first exterior case portion 121), and some other regions are formed to become the recess 123 (that is, the second exterior case portion 122). Here, since the adhesives 130 are dried, the contamination problem due to the adhesives 130 may not be caused. Next, the same process as shown and described in FIG. 8D is performed.

As described above, in the embodiments of the present invention, the adhesives 130 are dispensed on the entire surface of the substantially planar pouch exterior case 120, the process of forming the adhesives 130 is more facilitated. In particular, positions of the recess or sealing portions formed in the pouch exterior case 120 are not necessarily taken into consideration, thereby facilitating the adhesive forming process. Moreover, since the adhesives are formed on the sealing portion as well, sealing capacity of the sealing portion may be reinforced.

Figure 10A:
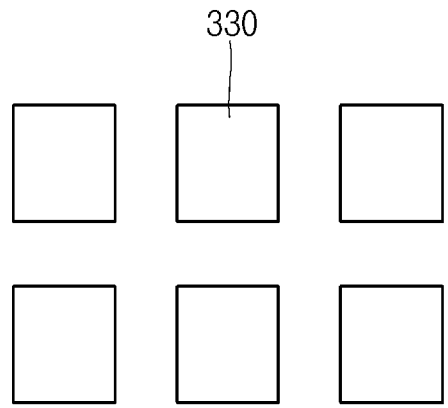
FIGS. 10A and 10B schematically illustrate states before and after compressing, preceded by dispensing adhesives on a surface of a laminate exterior case in a dot array form in a secondary battery according to various embodiments.
Figure 10B:
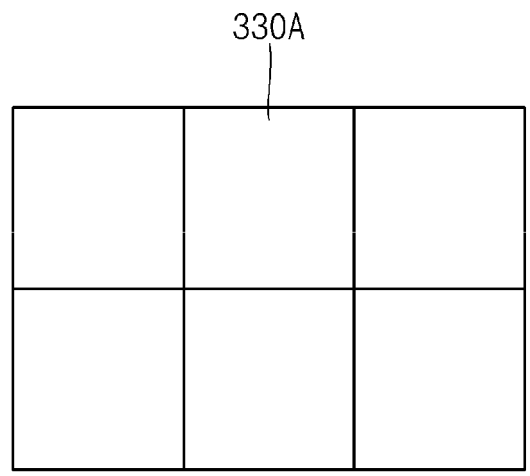

FIGS. 10A and 10B schematically illustrate states before and after compressing, preceded by dispensing adhesives on a surface of a laminate exterior case in a dot array form in a secondary battery according to various embodiments.

As illustrated in FIG. 10A, before compressing the laminate exterior case and the electrode assembly, the adhesives 330 dispensed in the dot array form are spaced apart from one another and are shaped of quadrangles having empty spaces therebetween (that is, quadrangles independent from each other), and as illustrated in FIG. 10B, after compressing the laminate exterior case and the electrode assembly, the adhesives 330A may overlap each other without empty spaces therebetween (that is, interconnected quadrangles independent from each other). In other words, while the yet-to-be compressed adhesives 330 are spaced apart from each other with empty spaces therebetween to be shaped of small quadrangles, the compressed adhesives 330A may overlap each other to be shaped of enlarged quadrangles without empty spaces. Accordingly, after compression, it is possible to prevent or substantially prevent an electrolyte solution from being trapped into the adhesives.

Figure 11A:
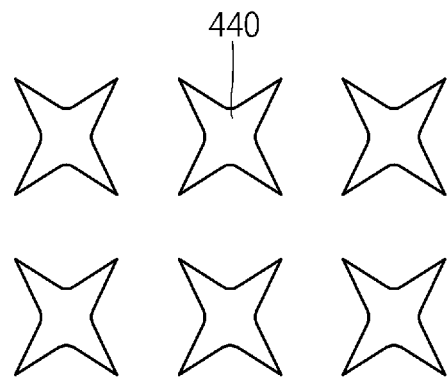
FIGS. 11A and 11B schematically illustrate states before and after compressing, preceded by dispensing adhesives on a surface of a laminate exterior case in a dot array form in a secondary battery according to various embodiments.
Figure 11B:
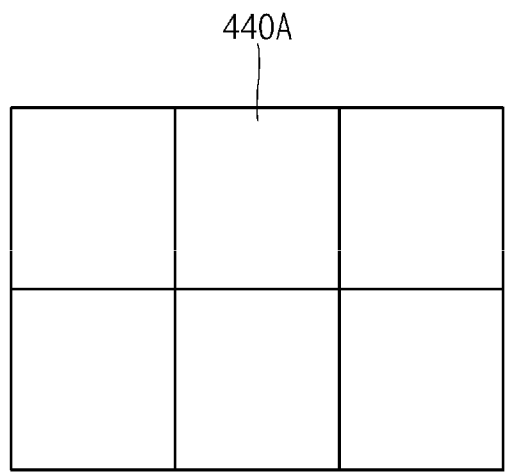

FIGS. 11A and 11B schematically illustrate states before and after compressing, preceded by dispensing adhesives on a surface of a laminate exterior case in a dot array form in a secondary battery according to various embodiments.

As illustrated in FIG. 11A, before compressing the laminate exterior case and the electrode assembly, the adhesives 430 dispensed in the dot array form are spaced apart from each other and are shaped of stars having empty spaces therebetween (that is, stars independent from each other), and as illustrated in FIG. 11B, after compressing the laminate exterior case and the electrode assembly, the adhesives 430A may overlap each other without empty spaces therebetween (that is, interconnected starts independent from each other). In other words, while the yet-to-be compressed adhesives 430 are spaced apart from each other with empty spaces therebetween to be shaped of small stars, the compressed adhesives 430A may overlap each other to be shaped of enlarged stars without empty spaces. Accordingly, after compression, it is possible to prevent or substantially prevent an electrolyte solution from being trapped into the adhesives.

Additionally, although not illustrated, before compressing the laminate exterior case and the electrode assembly, the adhesives dispensed in the dot array form may be shaped of triangles, pentagons, hexagons, polygons, or circles, which are spaced apart from each other with empty spaces therebetween. However, after compressing the laminate exterior case and the electrode assembly, the compressed adhesives may overlap each other to be enlarged without empty spaces therebetween.

Figure 12A:
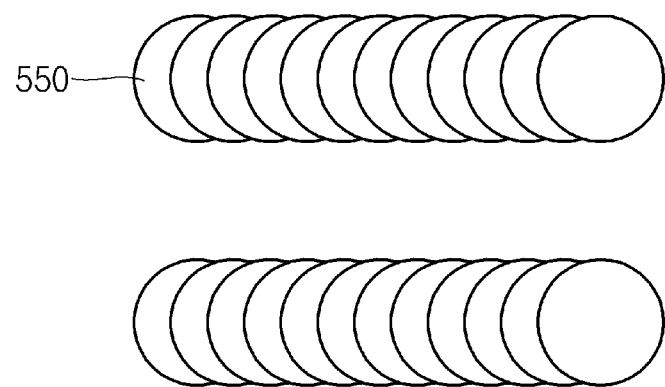
FIGS. 12A and 12B schematically illustrate states before and after compressing, preceded by dispensing adhesives on a surface of a laminate exterior case in a dot array form in a secondary battery according to various embodiments.
Figure 12B:
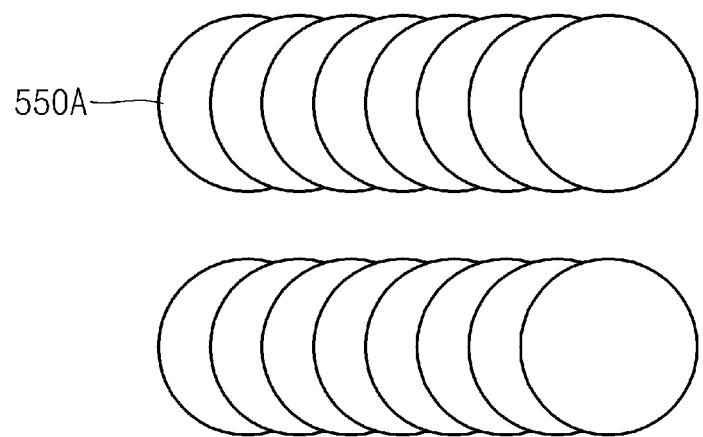

FIGS. 12A and 12B schematically illustrate states before and after compressing, preceded by dispensing adhesives on a surface of a laminate exterior case in a dot array form in a secondary battery according to various embodiments.

As illustrated in FIG. 12A, before compressing the laminate exterior case and the electrode assembly, adhesives 530 dispensed in the dot array form may overlap each other to form a line. Here, the line may include multiple lines. In addition, the respective lines may be spaced apart from each other. As illustrated in FIG. 12B, after compressing the laminate exterior case and the electrode assembly, adhesives 530A may be shaped of lines having relatively large widths. Here, the respective lines may be spaced apart from each other or may overlap each other.

Here, the adhesives may be shaped of triangles, quadrangles, pentagons, hexagons or stars, and may be dispensed to be narrowly spaced apart from each other so that they may overlap each other. On the basis of one line, the line-shaped adhesives may be coated in an increased amount, compared to dot-shaped adhesives, thereby improving adhesion strength between the laminate exterior case and the electrode assembly. In addition, since an electrolyte discharge passage is formed by a distance secured between the respective lines, it is possible to prevent occurrence of an electrolyte trap phenomenon.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
    an electrode assembly including a first electrode plate, a second electrode plate, and a separator interposed between the first electrode plate and the second electrode plate;
    a pouch exterior material for encompassing the electrode assembly; and
    adhesives dispensed in a dot array form on a surface of the pouch exterior material toward the electrode assembly,
    wherein after compression, the compressed adhesives have a pitch in a range of 1 mm to 5 mm and an equivalent diameter in a range of 1.1 mm to 7 mm.

2. The secondary battery of claim 1, wherein the pouch exterior material comprises:
   a first exterior case portion being in contact with one long side portion of the electrode assembly; and
   a second exterior case portion extending from the first exterior case portion and being in contact with an other long side portion of the electrode assembly,
   wherein the adhesives are formed on the first exterior case portion, on the second exterior case portion, or on both of the first and second exterior case portions.

3. The secondary battery of claim 2, wherein the first and second exterior case portions include sealing portions adhered to each other from the outside of the electrode assembly, and each of the sealing portions further includes the adhesives.

4. The secondary battery of claim 1, wherein the pouch exterior material comprises:
   a first insulation layer encompassing the electrode assembly;
   a metal layer formed on the first insulation layer; and
   a second insulation layer formed on the metal layer,
   wherein the adhesives are formed on the first insulation layer.

5. The secondary battery of claim 4, wherein the first insulation layer includes casted polypropylene or modified polypropylene.

6. The secondary battery of claim 4, wherein the adhesives include anchoring parts coupled to the first insulation layer.

7. The secondary battery of claim 1, wherein the adhesives dispensed in the dot array form include a regular quadrilateral form, or a zigzag form in which neighboring columns cross each other.

8. The secondary battery of claim 7, wherein before compressing the pouch exterior material and the electrode assembly, the adhesives dispensed in the dot array form are shaped of triangles, quadrangles, pentagons, hexagons, polygons, circles or stars, which are spaced apart from each other with empty spaces therebetween, and after compressing the pouch exterior material and the electrode assembly, the compressed adhesives overlap each other without empty spaces therebetween.

9. The secondary battery of claim 1, wherein the adhesives dispensed in the dot array form overlap each other to form a line, and the line includes multiple lines.

10. The secondary battery of claim 1, wherein the adhesives are adhered to the first electrode plate, the second electrode plate, or the separator in the electrode assembly.

11. The secondary battery of claim 1, wherein the adhesives have a thickness in a range of 1 μm to 50 μm.

12. The secondary battery of claim 1, wherein the adhesives have a peel strength in a range of 300 gf/25 mm to 2500 gf/25 mm.

13. The secondary battery of claim 1, wherein the adhesives have a pitch in a range of 1 mm to 5 mm and a diameter in a range of 0.8 mm to 5 mm.

14. The secondary battery of claim 1, wherein the adhesives are shaped to form deformed circles or deformed by overlapping portions thereof in contact with each other.

15. The secondary battery of claim 1, wherein the adhesives include any one of polymers selected from the group consisting of cellulose, polyvinylidenefluoride-cohexafluoropropylene, polyvinylidene fluoridecotrichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose, and polypropylene-maleic acid anhydride, or a mixture of two or more thereof.

16. A method for manufacturing a secondary battery method, the method comprising:
   preparing a planar pouch exterior case;
   forming at least one recess in some regions of the pouch exterior case so as to allow the pouch exterior case to accommodate electrode assembly;
   dispensing adhesives on at least one of a planar surface of the pouch exterior case and a bottom surface of the recess in a dot array form through a piezoelectric jetting process; and
   accommodating the electrode assembly in the recess of the pouch exterior case, sealing, and then compressing the pouch exterior case and the electrode assembly for the adhesives to adhere the pouch exterior case and the electrode assembly to each other.

17. A method for manufacturing a secondary battery method, the method comprising:
   preparing a planar pouch exterior case;
   dispensing adhesives on at least some regions of the pouch exterior case in a dot array form through a piezoelectric jetting process;
   forming at least one recess in some regions of the pouch exterior case so as to allow the pouch exterior case to accommodate electrode assembly; and
   accommodating the electrode assembly in the recess of the pouch exterior case, sealing, and then compressing the pouch exterior case and the electrode assembly for the adhesives to adhere the pouch exterior case and the electrode assembly to each other.

* * * * *